(12) United States Patent
Aalund et al.

(10) Patent No.: US 11,740,710 B1
(45) Date of Patent: Aug. 29, 2023

(54) CAPACITIVE FIELD TUNING FOR DETECTING TOUCHES ON OBJECTS PLACED ON A TOUCHSCREEN

(71) Applicant: Amazon Technologies, Inc., Seattle, WA (US)

(72) Inventors: Martin Aalund, Seattle, WA (US); Ali Moayer, Castro Valley, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/544,289

(22) Filed: Dec. 7, 2021

(51) Int. Cl.
| | | |
|---|---|---|
| *G06F 3/0354* | (2013.01) | |
| *G06F 3/041* | (2006.01) | |
| *G06F 3/0362* | (2013.01) | |
| *G06F 16/38* | (2019.01) | |
| *G06F 3/039* | (2013.01) | |
| *G06F 3/044* | (2006.01) | |

(52) U.S. Cl.
CPC .......... *G06F 3/0354* (2013.01); *G06F 3/0362* (2013.01); *G06F 3/044* (2013.01); *G06F 3/0416* (2013.01); *G06F 3/0393* (2019.05); *G06F 16/381* (2019.01); *G06F 2203/04108* (2013.01)

(58) Field of Classification Search
CPC ........ G06F 3/044; G06F 3/0416; G06F 3/041; G06F 16/381; G06F 3/0354; G06F 3/03545; G06F 3/0362; G06F 3/0393; G06F 2203/04108
See application file for complete search history.

(56) References Cited

U.S. PATENT DOCUMENTS

| | | | | |
|---|---|---|---|---|
| 9,898,148 | B2 * | 2/2018 | Tanemura | G06F 3/04166 |
| 10,592,042 | B1 * | 3/2020 | Lee | G06F 1/1628 |
| 2004/0252109 | A1 * | 12/2004 | Trent, Jr. | G06F 3/03547 |
| | | | | 345/174 |
| 2011/0248954 | A1 * | 10/2011 | Hamada | G06F 3/0448 |
| | | | | 345/174 |
| 2014/0139455 | A1 * | 5/2014 | Argiro | G06F 1/1632 |
| | | | | 345/173 |
| 2014/0192009 | A1 * | 7/2014 | Lai | G06F 3/0448 |
| | | | | 345/174 |
| 2014/0267169 | A1 * | 9/2014 | Mckiel, Jr. | G06F 3/0488 |
| | | | | 345/175 |
| 2015/0028894 | A1 * | 1/2015 | Sleeman | G06F 3/0446 |
| | | | | 324/662 |
| 2016/0216796 | A1 * | 7/2016 | Johansson | G06F 3/0412 |
| 2017/0131828 | A1 * | 5/2017 | Matta | G06F 3/04186 |
| 2018/0136738 | A1 * | 5/2018 | Argiro | G06F 3/0393 |
| 2021/0232269 | A1 * | 7/2021 | Sasaki | G06F 3/0446 |
| 2022/0050553 | A1 * | 2/2022 | Gray | G06F 3/0445 |
| 2022/0147189 | A1 * | 5/2022 | Kakinoki | G06F 3/0362 |
| 2022/0214796 | A1 * | 7/2022 | Taylor | G06F 3/04186 |

* cited by examiner

*Primary Examiner* — Darlene M Ritchie
(74) *Attorney, Agent, or Firm* — Lee & Hayes, P.C.

(57) ABSTRACT

Systems and methods for capacitive field tuning for detecting touches on objects are disclosed. For example, an identity of an object placed on a touch-sensitive surface is determined and signal impedance characteristics associated with the object are also determined. The signal impedance characteristics may be utilized to determine tuning settings to apply to capacitive sensors such that the capacitive field of the device extends from the touch-sensitive surface to a touch surface of the object.

20 Claims, 16 Drawing Sheets

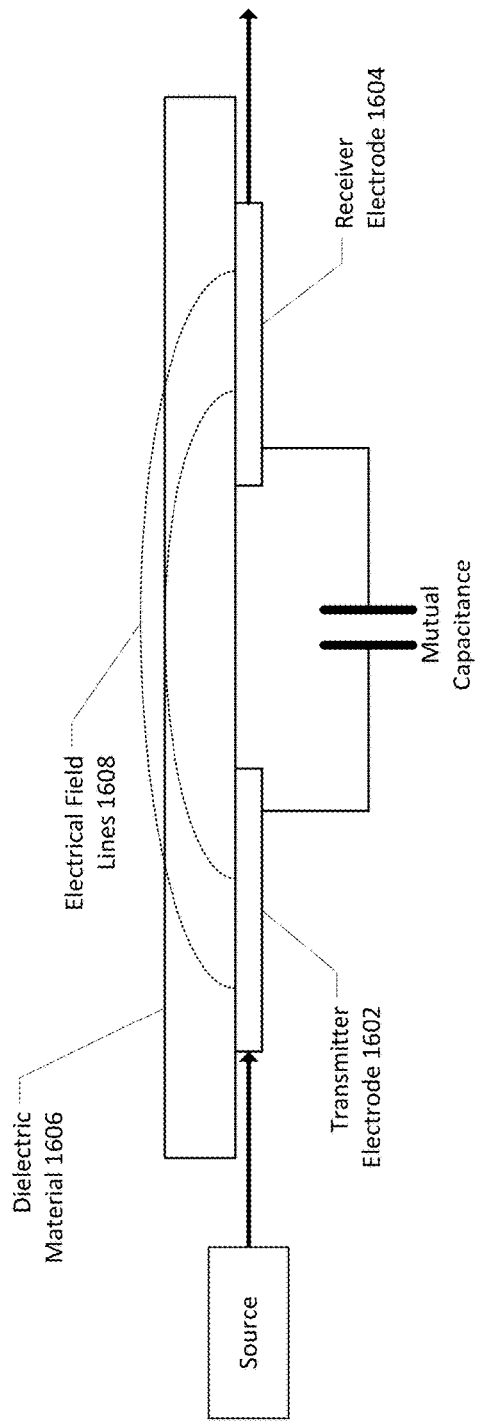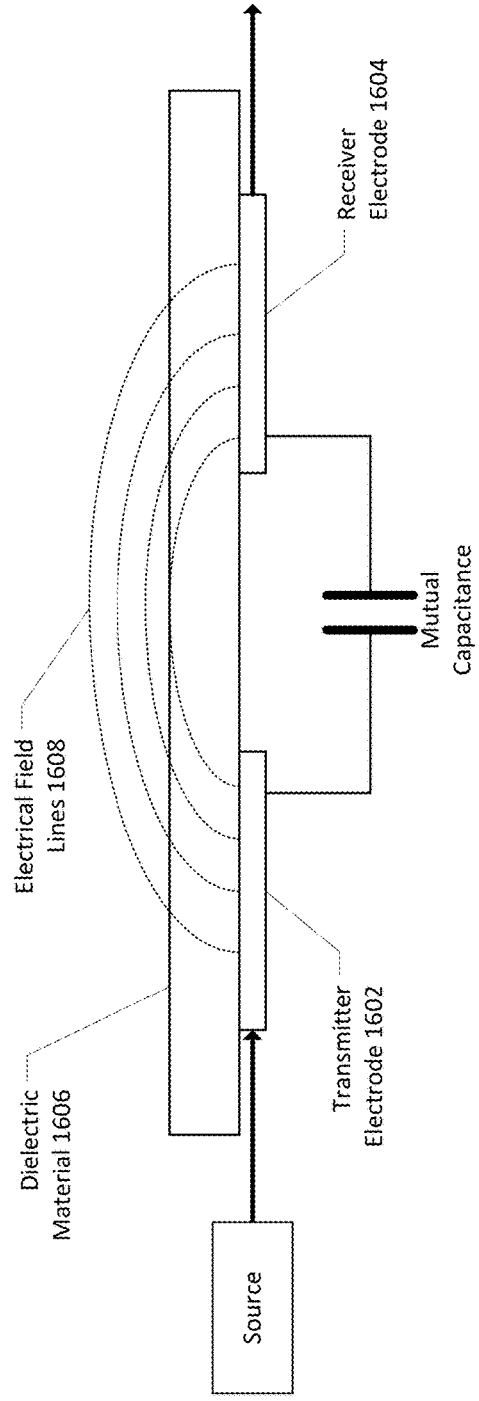

CAPACITIVE FIELD TUNING FOR DETECTING TOUCHES ON OBJECTS PLACED ON A TOUCHSCREEN

BACKGROUND

Touchpads have become more common in computing devices. Some touchpads utilize capacitive sensing to identify touches on those touchpads. Described herein are improvements in technology and solutions to technical problems that can be used to, among other things, enhance detection of touches with capacitive sensing.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 16A illustrates an example touch-sensitive surface with a first capacitive field tuning.

FIG. 16B illustrates an example touch-sensitive surface with a second capacitive field tuning.

DETAILED DESCRIPTION

Figure 1:
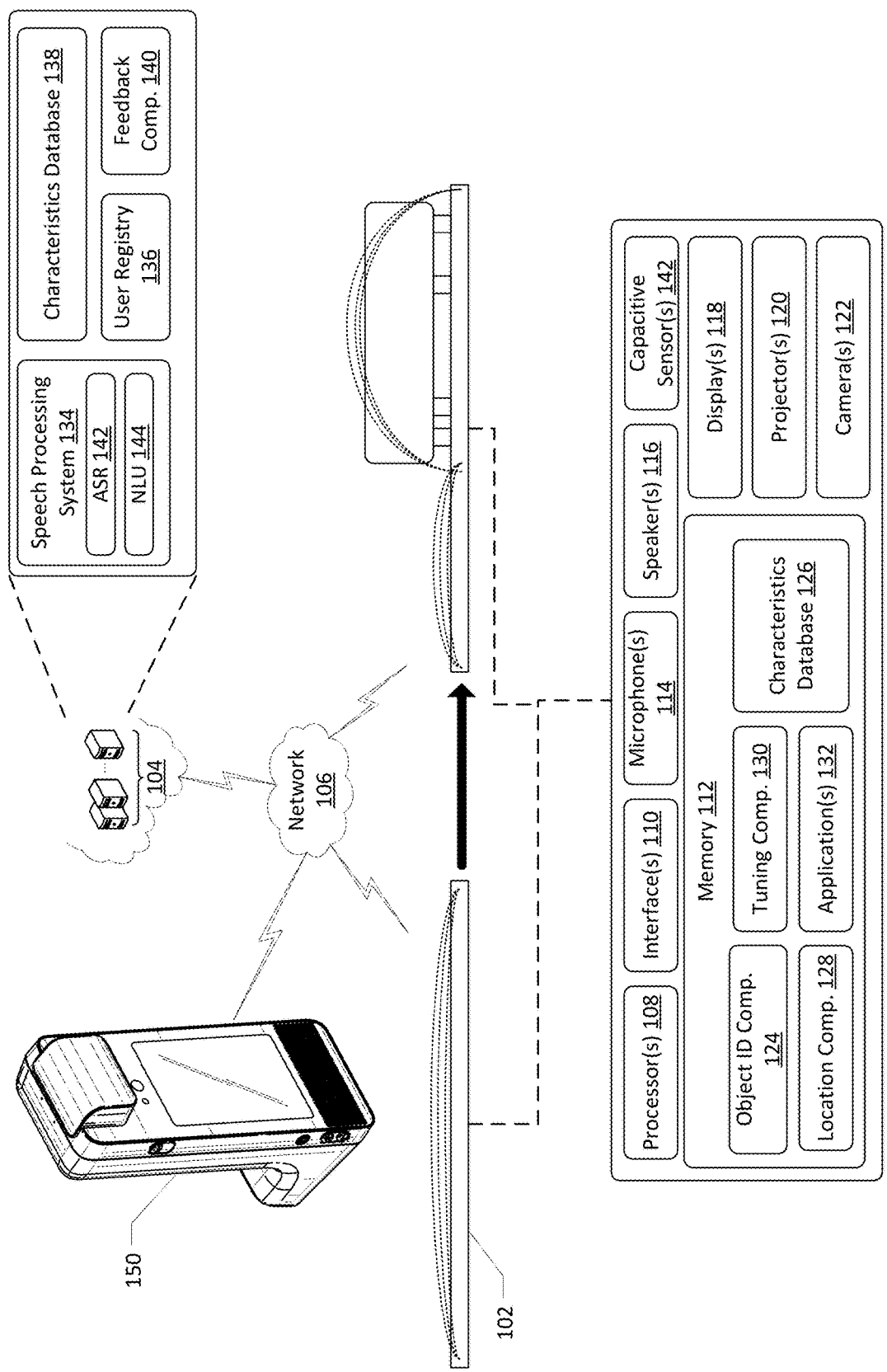
FIG. 1 illustrates a schematic diagram of an example environment for capacitive field tuning for detecting touches on objects.

Systems and methods for capacitive field tuning for detecting touches on objects are disclosed. Take, for example, an environment (such as a home, hotel, vehicle, office, store, restaurant, or other space) where one or more users may be present. The environments may include one or more electronic devices that may be utilized by the users. For example, the electronic devices may include voice interface devices (e.g., Echo devices, mobile phones, tablets, personal computers, televisions, appliances like refrigerators and microwaves, etc.), graphical interface devices (e.g., televisions, set top boxes, virtual/augmented reality headsets, etc.), and/or touch interface devices (tablets, phones, steering wheels, laptops, kiosks, billboard, other devices with buttons, etc.). These electronic devices may be situated in a home, in a place of business, healthcare facility (e.g., hospital, doctor's office, pharmacy, etc.), in a vehicle (e.g., airplane, truck, car, bus, etc.) in a public forum (e.g., shopping center, store, etc.), and/or at a hotel/quasi-public area, for example. In examples, the electronic devices may include a touch-sensitive surface, which may include capacitive sensing capabilities and may include one or more other components, such as processors, memory, interfaces, displays, cameras, microphones, and/or speakers.

Generally, one or more capacitive sensors of an electronic device may be tuned such that a touch is detected on a touch-sensitive surface of the electronic device when a user and/or object makes contact with the touch-sensitive surface. For example, one or more layers of a conductive mesh may be disposed in a device along with one or more layers between the conductive mesh and the touch-sensitive surface. Those one or more layers may include various dielectrics, adhesives, conductive coatings, acrylic and/or glass layers, plastic layers, and the touch-sensitive surface itself. To determine when a user and/or object touches the touch-sensitive surface without detecting a touch prior to the user and/or object making contact with the surface, the capacitive field generated by the capacitive sensors may be tuned in one or more ways. For example, generally, an electric signal is sent through the conductive mesh and multiple signal receivers capture the signal running through the conductive mesh. When no user and/or object is touching the surface, the electric signals are received at a certain strength and with certain characteristics. However, when a user and/or other conductive object enters the conductive field associated with the capacitive sensors, the mutual coupling between electrodes in a given row and column of the conductive mesh is altered. The alteration in mutual coupling may be measured by the capacitive sensor to determine when an object contacts, or nearly contacts, the surface and thus when to indicate that a touch as occurred. Given that the conductive mesh includes multiple electrode rows and columns, the mutual coupling alteration at given rows and columns and/or between rows and columns may allow for the determination of a location of the touch in question. Generally, various aspects of the capacitive sensor are tuned to allow for accurate detection of touch on the surface. Those aspects include an amplitude of the electrical signal applied to the electrodes, a frequency of the electrical signal applied to the electrodes, a gain setting associated with receiving the electrical signal at the receivers, and/or thresholds associated with determining when a mutual coupling alteration is interpreted as a touch or not. As used herein, the "gain setting" may be a setting for determining when a gain value is to be interpreted as being associated with a touch. For example, when an object contacts an electric field between a transmitter electrode and a receiver electrode, the gain value from the receiver electrode may change. The gain value in this example may indicate a voltage difference from the transmitter electrode to the receiver electrode. The tuning of these aspects may be based at least in part on a distance between the touch-sensitive surface and the conductive mesh as well as signal impedance characteristics of the touch-sensitive surface and/or the layers of material between the surface and the conductive mesh. These aspects of the capacitive sensor are generally tuned prior to a user acquiring the electronic device in question such that the user may utilize the touch-sensitive surface during a first use of the device. The tuning of such devices then may remain constant or otherwise fixed.

However, in certain examples, an object may be placed on the touch-sensitive surface and then a user and/or another object may touch the object. Generally, because the object placed on the surface has a given thickness and signal impedance, detection of touches on the object may not occur and/or may be inaccurate. To detect touches on objects placed on touch-sensitive surfaces, the capacitive field associated with the location of the object on the surface may be tuned such that the capacitive field extends from the touch-sensitive surface to the touch surface of the object while the object is disposed on the touch-sensitive surface of the device. Doing so may allow for detection of touches on the object while the object is placed on the device surface, and may allow the capacitive field to return to its original tuning for detecting touches on the device surface when the object is removed from the location.

To do so, an object is placed on a touch-sensitive surface of a device. The object may include one or more fiducials that may be disposed on the device such that the fiducials may contact the touch-sensitive surface when the object is placed on the device. The fiducials may be arranged in a unique and/or predesignated manner. The fiducials may also have unique and/or predesignated shapes. An object identification component of the device and/or a system associated with the device may utilize the characteristics of the touch input corresponding to the fiducials to identify the object and/or an object type of the object. For example, a first object may have eight fiducials that are arranged in two rectangular patterns. Four of the fiducials of the first object may be larger than the other four fiducials of the first object. These characteristics may be utilized by the object identification component of the device and/or the system to identify the first object. The object identification component may generate an indicator of the object and/or provide that indicator to a characteristics database along with request data to return signal impedance characteristics associated with the object. As described herein, a fiducial may be a portion of an object that comes into contact with the touch-sensitive surface. The fiducial may be made of the same material as the remainder of the object, such as a material that alters the capacitive field of the touch-sensitive surface in a way that can be detected as a touch when the fiducial is placed on the surface. In these examples, the fiducials act as touch inputs on the surface, and the arrangement of the fiducials and thus the location of touch inputs caused by the fiducials on the surface may be utilized to identify the object that includes the fiducials. In other examples, the fiducials may also include imaging markers such as when the system in question includes image processing. An example fiducial in this example may include one or more physical visual cues, such as a specific arrangement of dots, squares, or other shapes. In still other examples, the fiducials may be "smart" or otherwise include circuitry and components that allow the fiducial to at least send data to one or more components of a device configured to detect the fiducials. Such fiducials may utilize radio frequency identification and/or other technology to send signals.

The characteristics database may receive the request data and determine whether an object identifier for the object is present in the characteristics database. When present, the characteristics database may retrieve the signal impedance characteristics data for the device identifier and may return the signal impedance characteristics data to the object identification component and/or may provide the signal impedance characteristics data to a tuning component. Example signal impedance characteristics data may include a thickness of the object, a material that the object is made of, a gain setting of the capacitive sensor to be applied, a signal amplitude and/or a signal frequency to be applied, and/or any other data that may indicate how an electrical signal from the capacitive sensor may be impeded by the object and/or how the mutual coupling alteration may occur when a touch is received on the object.

Additionally, a location component of the device and/or the system may determine a location of the object on the touch-sensitive surface as well as an approximate area of the object. For example, as noted above, the location of the touch inputs from the fiducials may be utilized to determine an approximate location of the object on the touch-sensitive surface. Additionally, identification of the object by the object identification component may include determining an area and/or shape of the object. For example, a given object identifier may indicate that the corresponding object is a rectangle or a circle and that the object has certain dimensions, such as a rectangle having a length of approximately 5 centimeters and a width of approximately 2 centimeters, and/or a circle having a radius of 4 centimeters. The location component may utilize this information to determine which portion of the touch-sensitive surface corresponds to where the object is located. The location component may also be utilized to determine when the location of the object changes, such as when the object is moved on the touch-sensitive surface. Location data may be sent from the location component to the tuning component for capacitive field tuning.

The tuning component may be configured to receive the signal impedance characteristics data, the object identifier, and/or the location data and to determine how the capacitive field should be tuned to allow for detection of touches on the object. For example, when the signal impedance characteristics data indicates gain settings, signal amplitude settings, signal frequency settings, an amount of charge to apply, or other settings associated with the capacitive sensor, the tuning component may cause those settings to be applied to the capacitive sensor for an area of the touch-sensitive surface corresponding to the area where the object is disposed. In other examples, when the signal impedance characteristics data indicates the thickness of the object and/or the material of the object, the tuning component may determine tuning settings to be applied based at least in part on the signal impedance characteristics data. Determining the tuning settings may be performed by analyzing the features of the object in association with known settings associated with those features. Determining the tuning settings may also be performed utilizing one or more modeling techniques, such as machine learning models, as will be described in more detail below. The tuning component may be configured to apply the settings as described herein to certain electrodes of the capacitive mesh. For example, each electrode row and electrode column may be given an identifier, and the rows and columns that are associated with the area and location of the object may be tuned based at least in part on the settings such that the capacitive field extends from the touch-sensitive surface to the touch surface of the object. It should be understood that the surface of the object that may receive touch input from the user and/or another object may be described herein as the opposing surface from the touch-sensitive surface of the device. As such, a surface of the object that is proximal to the touch-sensitive surface of the device may include the one or more fiducials, while a distal surface of the object may be the opposing surface and/or opposing side of the object relative to the proximal surface.

In examples where multiple objects are placed on the touch-sensitive surface of the device at the same time, the tuning component may be configured to determine how to tune the capacitive field as to each object. For example, the techniques described herein may be utilized to tune a first portion of the capacitive sensor to detect touches on a first object surface having first characteristics such as a first height. Additionally, the techniques described herein may be utilized to tune a second portion of the capacitive sensor to detect touches on a second object surface having second characteristics such as a second height that differs from the first height. By so doing, touch input may be detected on the first object, on the second object, and on areas of the touch-sensitive surface not occupied by the first object or the second object, all at the same time.

Additionally, the tuning component may be configured to tune the capacitive sensor when multiple objects are stacked on each other. For example, when a first object is placed on the touch-sensitive surface, that first object may be identified and the capacitive sensor may be tuned at the location of the first object based on that object's signal impedance characteristics such that touches may be detected on the surface of the first object. Thereafter, a second object may be placed or otherwise stacked on the first object. Given that the capacitive sensor was tuned to detect touches on the surface of the first object, the capacitive sensor may detect fiducials from the second object touching the first object. The second object may be identified and the capacitive sensor may be tuned at the location of the second object based on that object's signal impedance characteristics and/or a combination of the signal impedance characteristics of the first object and the second object. Thereafter, touch input may be detected on the surface of the second object as stacked on the first object.

Additionally, in examples, the signal impedance characteristics and/or tuning settings for a given object may not be known when the object is placed on the touch-sensitive surface of the device. In these examples, dynamic tuning of the capacitive sensor may be performed to determine the tuning settings to be applied. For example, the object may be placed on the touch-sensitive surface and the device may determine whether the object can be identified and/or whether characteristics associated with the object are known. If known, the techniques described herein associated with the characteristics database may be performed to determine the tuning settings to be applied to the capacitive sensor. If not known, the device and/or another device may output a request for the user to provide touch input to the surface of the object. The settings of the capacitive field of the device may be modulated and the resulting received signals may be analyzed to determine which settings are associated with the receipt of a touch input on the object. Those settings may include detecting a gain value where the touch input is detected on the object. That gain value may be utilized to determine a gain setting to be applied to the capacitive sensor at the location of the object. The same process may be performed for other tuning settings of the capacitive sensor.

Additionally, once the capacitive field is tuned such that touch input on the surface of the object may be detected, the capacitive sensor may receive touch inputs on the object and/or on the touch-sensitive surface. Given the object at issue and the detected touch, such touch input may be interpreted to perform a given action in association with one or more applications. The applications may be associated with the object at issue and/or may be agnostic of the object at issue. For example, a given object may be associated with a gaming application, and when the object is identified the device may determine that the gaming application is to be utilized to interpret and act on touch input received while the device is disposed on the touch-sensitive surface. The application(s) may receive touch input data indicating detected touches on the object and may utilize that touch input data to determine one or more actions to be performed by the device and/or another device. Example actions may include, for example, causing display of certain images, causing output of certain sounds, causing the initiation and/or cessation of certain operations by the device, etc.

Additionally, in examples where a projection device is being utilized, detection of the object on the touch-sensitive surface may cause one or more images to be displayed on the touch-sensitive surface. The images may differ in the area of the touch-sensitive surface that corresponding to the location where the object is placed and/or where touch is detected on one or more surfaces of the object. In addition to the capacitive field tuning described herein, the use of computer vision and/or IR sensing, as described more fully below, can be utilized to detect touches and/or to determine actions to take in response to detecting certain touches, objects, movements, etc. For example, to sense interactions, a device may include an emitter and a sensor. The emitter may broadcast a plane of light across a space for sensing inputs of a user. The sensor may detect the touch or interactions through the scattering of IR light as the user breaks, or crosses, the plane of light. That is, as the user works on, for example, a piece of homework, the location of the input may be sensed by the sensor detecting the scattering of light. In turn, the device may transmit data to another device. The capacitive touch sensing described herein can be utilized to inform the detection of touches by the IR sensor(s), and/or the IR sensor data can be utilized to inform the detection of touches by the capacitive touch sensors. In examples, the tuning of the capacitive field at a location of an object to a certain height above the touch-sensitive surface may be utilized to change the plane of IR light. Likewise, the capacitive field tuning and the operations associated therewith such as the use of fiducials to identify objects may be utilized along with the computer vision techniques to more accurately identify objects, determine object characteristics, and otherwise configure the device(s) to detect objects and/or touches on objects.

Additionally, the techniques described herein may be utilized for communications between devices. For example, a first user may be located in a first location and the second user may be located in a second location that is remote from the first location. The devices associated with the users may send and receive information to and from each other, enabling interactivity between the first user and the second user. For example, a camera of one device may capture images and generate image data. The devices may further include microphones for capturing speech of the first user and loudspeakers for outputting audio associated with the second user. This image data, and/or other data, may then be transmitted to the remote device for output. To sense interactions within a given area, the device at issue may include an emitter and a sensor. The emitter may broadcast a plane of light across a shared space for sensing inputs of the first user. The sensor may detect the touch or interactions through the scattering of IR light as the first user breaks, or crosses, the plane of light. In turn, the device may transmit data to the remote device. Additionally, the use of capacitive sensing, and particularly the detection of touch on objects placed in the shared space may be performed as described herein. The second user may also provide input and representations of that input and/or actions associated with that input may be performed by the first device.

In addition to the above, a feedback component, which may be a component of the device and/or the system associated with the device, may generate feedback data indicating how touches were detected or not detected on objects when the capacitive field is tuned as described herein. This feedback data may be utilized to determine whether the tuning settings as described herein should be adjusted for given devices, given capacitive sensors, given objects, given user profiles, etc. The feedback data may be associated with the device in question and/or may be associated with one or more other devices, such as devices associated with other users and/or user profiles. As will be described in more detail, machine learning models may be utilized to receive the feedback data and to generate result data indicating how the tuning settings should be adjusted.

Additionally, or alternatively, identification of the object disposed on the touch-sensitive surface may be performed in ways other than by using fiducials. For example, when an object is placed on the device, other forms of input data may be analyzed to identify the object. The other forms of input data may include audio data representing a user utterance indicating the object on the device. Speech processing may be performed on the audio data to determine an identifier of the object and/or characteristics of the object. The input data may additionally, or alternatively, include image data that may be analyzed to identify the depicted object. The input data may additionally, or alternatively, include radio frequency identification (RFID) data, particularly where the object includes an RFID tag. The input data may also include any other data that may be utilized to identify the object, characteristics of the object, and/or the object type of the object.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for capacitive field tuning for detecting touches on objects. The system 100 may include, for example, one or more devices 102. In certain examples, the devices 102 may be a voice-enabled device (e.g., Echo devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In examples, the devices 102 may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, hotel, etc.), for example. In examples, the electronic devices 102 may include a touch-sensitive surface, which may be any device that includes capacitive sensing capabilities and may include one or more other components, such as processors, memory, interfaces, displays, cameras, microphones, and/or speakers. The devices 102 may be configured to send data to and/or receive data from a system 104, such as via a network 106. It should be understood that where operations are described herein as being performed by the system 104, some or all of those operations may be performed by the devices 102. It should also be understood that anytime the system 104 is referenced, that system may include any system and/or device, whether local to an environment of the devices 102 or otherwise, unless specifically noted to be local and/or remote in a given example. Additionally, it should be understood that a given space and/or environment may include numerous devices 102. It should also be understood that when a "space" or "environment" is used herein, those terms mean an area and not necessarily a given room, building, or other structure, unless otherwise specifically described as such.

The devices 102 may include one or more components, such as, for example, one or more processors 108, one or more network interfaces 110, memory 112, one or more microphones 114, one or more speakers 116, one or more displays 118, one or more projectors 120, one or more cameras 122, and/or one or more capacitive sensors 142. The microphones 114 may be configured to capture audio, such as user utterances, and generate corresponding audio data. The speakers 116 may be configured to output audio, such as audio corresponding to audio data received from another device and/or the system 104. The displays 118 may be configured to present images, such as images corresponding to image data received from another device and/or the system 104. The one or more projectors 120 may be configured to project images and/or light, such as onto the touch-sensitive surface of the device 102. The one or more cameras 122 may be configured to capture images, such as images of the touch-sensitive surface and/or objects within a field of view of the cameras 122. The one or more capacitive sensors 142 may be configured to apply a charge in a way that creates a capacitive field associated with the touch-sensitive surface and to measure changes in the charge over time for the purpose of detecting touches on the touch-sensitive surface. The memory 112 may include components such as, for example, an object identification component 124, a characteristics database 126, a location component 128, a tuning component 130, and/or one or more applications 132. Each of these components of the memory 112 will be described in detail below.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 106 and to communicate with other devices in the system 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The system 104 may include components such as, for example, a speech processing system 134, a user registry 136, a characteristics component 138, and/or a feedback component 140. It should be understood that while the components of the system 104 are depicted and/or described as separate from each other in FIG. 1, some or all of the components may be a part of the same system. The speech processing system 134 may include an automatic speech recognition component (ASR) 142 and/or a natural language understanding component (NLU) 144. Each of the components described herein with respect to the system 104 may be associated with their own systems, which collectively may be referred to herein as the system 104, and/or some or all of the components may be associated with a single system. Additionally, the system 104 may include one or more applications, which may be described as skills. "Skills," as described herein may be applications and/or may be a subset of an application. For example, a skill may receive data representing an intent. For example, an intent may be determined by the NLU component 144 and/or as determined from user input via a computing device. Skills may be configured to utilize the intent to output data for input to a text-to-speech component, a link or other resource locator for audio data, and/or a command to a device, such as the devices 102. "Skills" may include applications running on devices, such as the devices 102, and/or may include portions that interface with voice user interfaces of devices 102.

In instances where a voice-enabled device is utilized, skills may extend the functionality of devices 102 that can be controlled by users utilizing a voice-user interface. In some examples, skills may be a type of application that may be useable in association with connected devices and may have been developed specifically to work in connection with given connected devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

The components of the devices 102 and the system 104 are described in detail below. In examples, some or each of the components of the system 104 may include their own processor(s), network interface(s), and/or memory. As such, by way of example, the speech processing system 134 may include and/or be associated with processor(s), network interface(s), and/or memory. The other components of the system 104, such as the feedback component 140, may include and/or be associated with different processor(s), network interface(s), and/or memory, or one or more of these components may utilize some or all of the same processor(s), network interface(s), and/or memory utilized by the speech processing system 134. These components are described in detail below. Additionally, the operations and/or functionalities associated with and/or described with respect to the components of the system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the system 104, the user registry 136 may be configured to determine and/or generate associations between users, user accounts, environment identifiers, and/or devices. For example, one or more associations between user accounts may be identified, determined, and/or generated by the user registry 136. The user registry 136 may additionally store information indicating one or more applications and/or resources accessible to and/or enabled for a given user account. Additionally, the user registry 136 may include information indicating device identifiers, such as naming identifiers, associated with a given user account, as well as device types associated with the device identifiers. The user registry 136 may also include information indicating user account identifiers, naming indicators of devices associated with user accounts, and/or associations between devices, such as the devices 102. The user registry 136 may also include information associated with usage of the devices 102. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data. As described herein, the user registry 136 may be considered a registry of devices for given account data.

The speech-processing system 134 may be configured to receive audio data from the devices 102 and/or other devices and perform speech-processing operations. For example, the ASR component 142 may be configured to generate text data corresponding to the audio data, and the NLU component 144 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "play Game A," the NLU component 144 may identify a "play" intent and the payload may be "Game A." In this example where the intent data indicates an intent to initiate playing Game A, the speech processing system 134 may call one or more speechlets to effectuate the intent. Speechlets, as described herein may otherwise be described as applications and may include functionality for utilizing intent data to generate directives and/or instructions. For example, an application associated with Game A may be called. The application may be designated as being configured to handle the intent of initiating and playing Game A, for example. The application may receive the intent data and/or other data associated with the user utterance from the NLU component 144, such as by an orchestrator of the system 104, and may perform operations to initiate Game A, for example. The system 104 may generate audio data confirming that the game has been started, such as by a text-to-speech component. The audio data may be sent from the system 104 to one or more of the devices 102.

The components of the system 100 are described below by way of example. For example, an object may be placed on a touch-sensitive surface of the device 102. The object may include one or more fiducials that may be disposed on the object such that the fiducials may contact the touch-sensitive surface when the object is placed on the device 102. The fiducials may be arranged in a unique and/or predesignated manner. The fiducials may also have unique and/or predesignated shapes. The object identification component 124 of the device 102 and/or a system 104 associated with the device 102 may utilize the characteristics of the touch input corresponding to the fiducials to identify the object and/or an object type of the object. For example, a first object may have eight fiducials that are arranged in two rectangular patterns. Four of the fiducials of the first object may be larger than the other four fiducials of the first object. These characteristics may be utilized by the object identification component 124 to identify the first object. The object identification component 124 may generate an indicator of the object and/or provide that indicator to the characteristics database 126 along with request data to return signal impedance characteristics associated with the object.

The characteristics database 126 may receive the request data and determine whether an object identifier for the object is present in the characteristics database 126. When present, the characteristics database 126 may retrieve the signal impedance characteristics data for the device identifier and may return the signal impedance characteristics data to the object identification component 124 and/or may provide the signal impedance characteristics data to the tuning component 130. Example signal impedance characteristics data may include a thickness of the object, a material that the object is made of, a gain setting of the capacitive sensor 142 to be applied, a signal amplitude and/or a signal frequency to be applied, and/or any other data that may indicate how an electrical signal from the capacitive sensor 142 may be impeded by the object and/or how the mutual coupling alteration may occur when a touch is received on the object.

Additionally, the location component 128 may determine a location of the object on the touch-sensitive surface as well as an approximate area of the object. For example, as noted above, the location of the touch inputs from the fiducials may be utilized to determine an approximate location of the object on the touch-sensitive surface. Additionally, identification of the object by the object identification component 124 may include determining an area and/or shape of the object. For example, a given object identifier may indicate that the corresponding object is a rectangle or a circle and that the object has certain dimensions, such as a rectangle having a length of approximately 5 centimeters and a width of approximately 2 centimeters, and/or a circle having a radius of 4 centimeters. The location component 128 may utilize this information to determine which portion of the touch-sensitive surface corresponds to where the object is located. The location component 128 may also be utilized to determine when the location of the object changes, such as when the object is moved on the touch-sensitive surface. Location data may be sent from the location component 128 to the tuning component 130 for capacitive field tuning.

The tuning component 130 may be configured to receive the signal impedance characteristics data, the object identifier, and/or the location data and to determine how the capacitive field should be tuned to allow for detection of touches on the object. For example, when the signal impedance characteristics data indicates gain settings, signal amplitude settings, signal frequency settings, an amount of charge to apply, or other settings associated with the capacitive sensor 142, the tuning component 130 may cause those settings to be applied to the capacitive sensor 142 for an area of the touch-sensitive surface corresponding to the area where the object is disposed. In other examples, when the signal impedance characteristics data indicates the thickness of the object and/or the material of the object, the tuning component 130 may determine the capacitive sensor settings to be applied based at least in part on the signal impedance characteristics data. Determining the capacitive sensor settings may be performed by analyzing the features of the object in association with known settings associated with those features. Determining the capacitive sensor settings may also be performed utilizing one or more modeling techniques, such as machine learning models. The tuning component may be configured to apply the settings as described herein to certain electrodes of the capacitive mesh. For example, each electrode row and electrode column of the mesh may be given an identifier, and the rows and columns that are associated with the area and location of the object may be tuned based at least in part on the settings such that the capacitive field extends from the touch-sensitive surface to the surface of the object. It should be understood that the surface of the object that may receive touch input from the user and/or another object may be described herein as the opposing surface from the touch-sensitive surface of the device. As such, a surface of the object that is proximal to the touch-sensitive surface of the device may include the one or more fiducials, while a distal surface of the object may be the opposing surface and/or opposing side of the object relative to the proximal surface.

In examples where multiple objects are placed on the touch-sensitive surface of the device 102 at the same time, the tuning component 130 may be configured to determine how to tune the capacitive field as to each object. For example, the techniques described herein may be utilized to tune a first portion of the capacitive sensor 142 to detect touches on a first object surface having first characteristics such as a first height. Additionally, the techniques described herein may be utilized to tune a second portion of the capacitive sensor 142 to detect touches on a second object surface having second characteristics such as a second height that differs from the first height. By so doing, touch input may be detected on the first object, on the second object, and on areas of the touch-sensitive surface not occupied by the first object or the second object, all at the same time.

Additionally, the tuning component 130 may be configured to tune the capacitive sensor when multiple objects are stacked on each other. For example, when a first object is placed on the touch-sensitive surface, that first object may be identified and the capacitive sensor 142 may be tuned at the location of the first object based on that object's signal impedance characteristics such that touches may be detected on the surface of the object. Thereafter, a second object may be placed or otherwise stacked on the first object. Given that the capacitive sensor 142 was tuned to detect touches on the surface of the first object, the capacitive sensor 142 may detect fiducials from the second object touching the first object. The second object may be identified and the capacitive sensor 142 may be tuned at the location of the second object based on that object's signal impedance characteristics and/or a combination of the signal impedance characteristics of the first object and the second object. Thereafter, touch input may be detected on the surface of the second object as stacked on the first object.

Additionally, in examples, the signal impedance characteristics and/or tuning settings for a given object may not be known when the object is placed on the touch-sensitive surface of the device 102. In these examples, dynamic tuning of the capacitive sensor 142 may be performed to determine the tuning settings to be applied. For example, the object may be placed on the touch-sensitive surface and the device 102 may determine whether the object can be identified and/or whether characteristics associated with the object are known. If known, the techniques described herein associated with the characteristics database may be performed to determine the tuning settings to be applied to the capacitive sensor 142. If not known, the device 102 and/or another device may output a request for the user to provide touch input to the surface of the object. The settings of the capacitive field of the device 102 may be modulated and the resulting received signals may be analyzed to determine which settings are associated with the receipt of a touch input on the object. Those settings may include detecting a gain value where the touch input is detected on the object. That gain value may be utilized to determine a gain setting to be applied to the capacitive sensor 142 at the location of the object. The same process may be performed for other tuning settings of the capacitive sensor 142.

Additionally, once the capacitive field is tuned such that touch input on the surface of the object may be detected, the capacitive sensor 142 may receive touch inputs on the object and/or on the touch-sensitive surface. Given the object at issue and the detected touch, such touch input may be interpreted to perform a given action in association with one or more of the applications 132. The applications 132 may be associated with the object at issue and/or may be agnostic of the object at issue. For example, a given object may be associated with a gaming application 132, and when the object is identified the device 102 may determine that the gaming application 132 is to be utilized to interpret and act on touch input received while the device 102 is disposed on the touch-sensitive surface. The application(s) 132 may receive touch input data indicating detected touches on the object and may utilize that touch input data to determine one or more actions to be performed by the device 102 and/or another device. Example actions may include, for example, causing display of certain images, causing output of certain sounds, causing the initiation and/or cessation of certain operations by the device 102, etc.

In addition to the above, the feedback component 140, which may be a component of the device 102 and/or the system 104, may generate feedback data indicating how touches were detected or not detected on objects when the capacitive field is tuned as described herein. This feedback data may be utilized to determine whether the tuning settings as described herein should be adjusted for given devices, given capacitive sensors, given objects, given user profiles, etc. The feedback data may be associated with the device 102 in question and/or may be associated with one or more other devices, such as devices associated with other users and/or user profiles. As will be described in more detail, machine learning models may be utilized to receive the feedback data and to generate result data indicating how the tuning settings should be adjusted.

For example, the machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

As described herein, the machine learning models may be configured to be trained utilizing a training dataset associated with prior tuning settings applied to the device 102 and/or other devices. The models may be trained for multiple user accounts and/or for a specific user account. As such, the machine learning models may be configured to learn, without human intervention, attributes of collected feedback data and capacitive field tuning to determine tuning settings to be applied when given objects are detected.

Additionally, or alternatively, identification of the object disposed on the touch-sensitive surface may be performed in ways other than by using fiducials. For example, when an object is placed on the device 102, other forms of input data may be analyzed to identify the object. The other forms of input data may include audio data representing a user utterance indicating the object on the device. Speech processing may be performed on the audio data to determine an identifier of the object. The input data may additionally, or alternatively, include image data that may be analyzed to determine the depicted object. The input data may additionally, or alternatively, include RFID data, particularly where the object includes an RFID tag. The input data may also include any other data that may be utilized to identify the object, characteristics of the object, and/or the object type of the object. In examples, the object may include Bluetooth and/or Bluetooth Low Energy capabilities. In these examples, information may be stored on the device in question that may allow for tuning the capacitive field and/or locate the device. For example, the Bluetooth functionality may be utilized to identify the fiducial, such as the type of fiducial and/or the form of the fiducial, that is used to locate the device and may include information on the size, thickness, and/or other parameters of the device that may be utilized to tun the capacitive field. In still other examples, if the device has a speaker or light elements, such as light emitting diodes, those components may be utilized to transmit data back to the touch surface based on a Bluetooth query, for example, light striking the object, and/or the presence of a capacitive field.

It should be noted that while text data is described as a type of data utilized to communicate between various components of the system 104 and/or other systems and/or devices, the components of the system 104 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102.

As shown in FIG. 1, several of the components of the system 104 and the associated functionality of those components as described herein may be performed by one or more of the devices 102. Additionally, or alternatively, some or all of the components and/or functionalities associated with the devices 102 may be performed by the system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 108 and/or the processor(s) described with respect to the components of the system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or the processor(s) described with respect to the components of the system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) described with respect to the components of the system 104 may possess its own local memory, which also may store program components, program data, and/or one or more operating systems.

The memory 112 and/or the memory described with respect to the components of the system 104 may include volatile and nonvolatile memory, removable and non-removable media implemented in any method or technology for storage of information, such as computer-readable instructions, data structures, program component, or other data. Such memory 112 and/or the memory described with respect to the components of the system 104 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112 and/or the memory described with respect to the components of the system 104 may be implemented as computer-readable storage media ("CRSM"), which may be any available physical media accessible by the processor(s) 108 and/or the processor(s) described with respect to the system 104 to execute instructions stored on the memory 112 and/or the memory described with respect to the components of the system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112 and/or the memory described with respect to the components of the system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 110 and/or the network interface(s) described with respect to the components of the system 104 may enable messages between the components and/or devices shown in system 100 and/or with one or more other polling systems, as well as other networked devices. Such network interface(s) 110 and/or the network interface(s) described with respect to the components of the system 104 may include one or more network interface controllers (NICs) or other types of transceiver devices to send and receive messages over the network 106.

For instance, each of the network interface(s) 110 and/or the network interface(s) described with respect to the components of the system 104 may include a personal area network (PAN) component to enable messages over one or more short-range wireless message channels. For instance, the PAN component may enable messages compliant with at least one of the following standards IEEE 802.15.4 (Zig-Bee), IEEE 802.15.1 (Bluetooth), IEEE 802.11 (WiFi), or any other PAN message protocol. Furthermore, each of the network interface(s) 110 and/or the network interface(s) described with respect to the components of the system 104 may include a wide area network (WAN) component to enable message over a wide area network.

In some instances, the system 104 may be local to an environment associated the devices 102. For instance, the system 104 may be located within one or more of the devices 102. In some instances, some or all of the functionality of the system 104 may be performed by one or more of the devices 102. Also, while various components of the system 104 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device and/or edge server in a home and/or office environment, a self-driving automobile, a bus, an airplane, a camper, a trailer, and/or other similar object having a computer to perform its own sensor processing, etc.

Figure 2B:
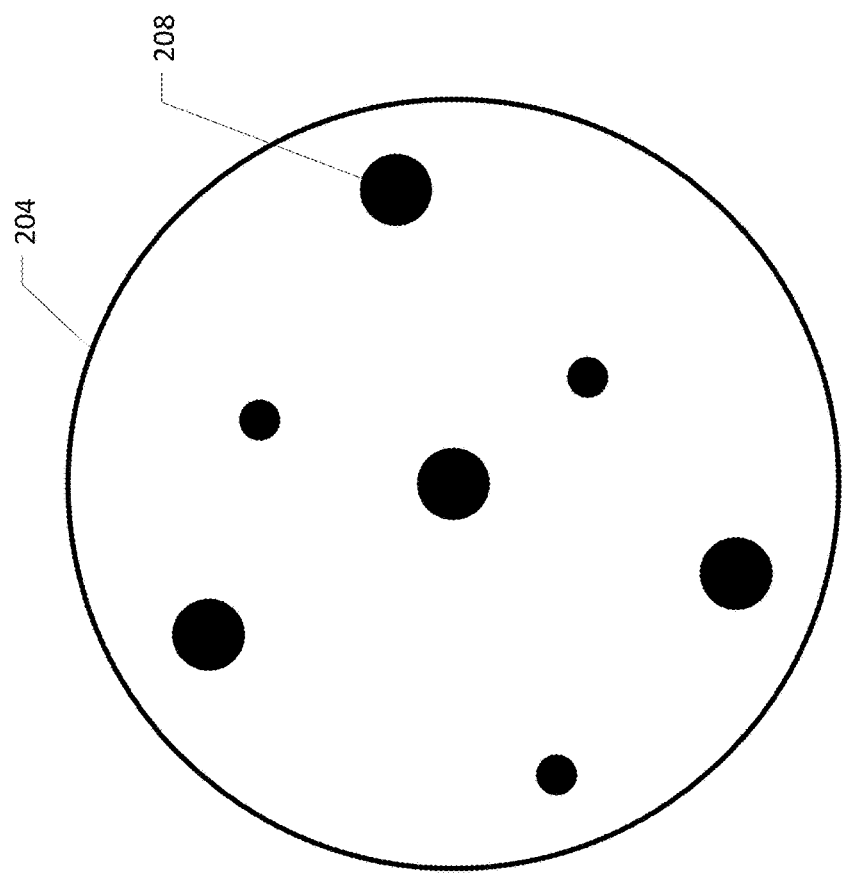
FIG. 2B illustrates a conceptual diagram of another example object on which touches may be detected with capacitive field tuning.
Figure 2A:
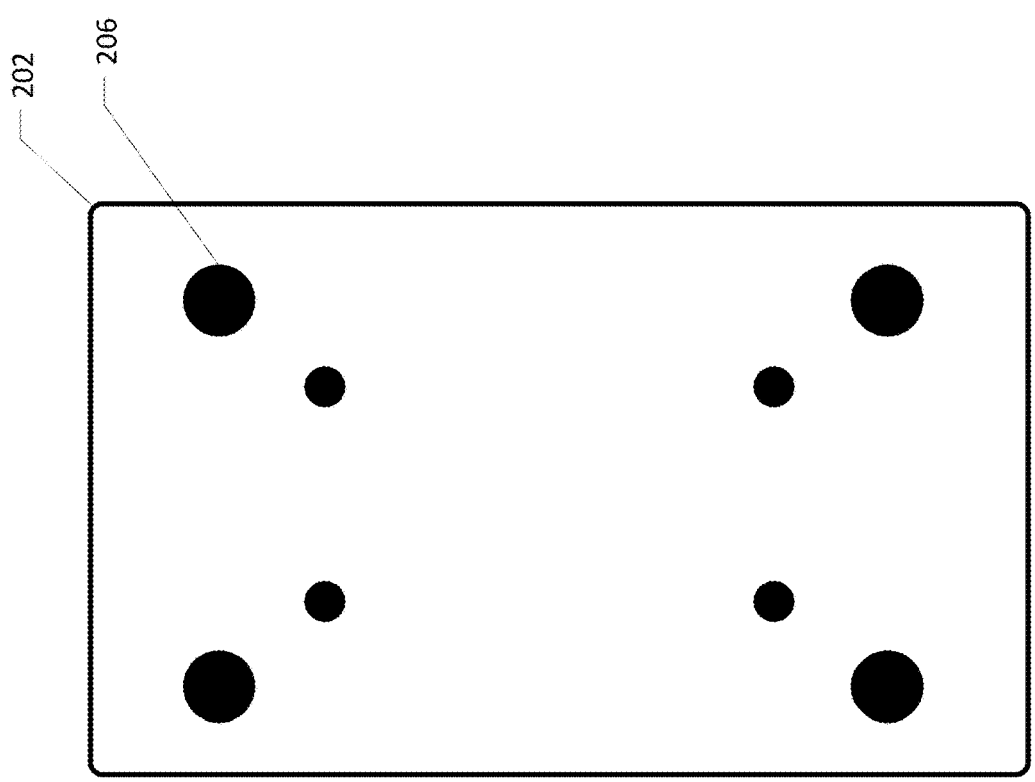
FIG. 2A illustrates a conceptual diagram of an example object on which touches may be detected with capacitive field tuning.

FIG. 2A illustrates a conceptual diagram of an example object on which touches may be detected with capacitive field tuning. A bottom view of the example object 202 is depicted in FIG. 2A. As shown, the object 202 may include one or more fiducials 206. The fiducials 206 may be disposed on one or more sides of the object 202 and may be disposed at various locations with respect to the object 202. In examples, the fiducials 206 may be disposed on a border or boundary of the object 202 and may be disposed on the corners and/or edges of the object 202. For example, a given object 202 may have a triangular shape and each of the fiducials 206 may be disposed at the three corners of the object 202. This arrangement of fiducials 206 may be determined by a touchscreen and/or a projector/camera system. The distances between the fiducials 206 and directional data associated with the fiducials 206 may be determined and utilized to determine an identity of the object 202 and/or the object type and/or a shape of the object 202. In this example, the distances between the fiducials 206 may be the same or substantially similar and the directional data indicates that the object 202 has the shape of an equilateral triangle.

It should be noted that the fiducials 206 of the object 202 need not be disposed on the corners of an object. Additionally, or alternatively, fiducials 206 may be disposed on any portion of the object 202. It should also be noted that while eight fiducials 206 are shown in FIG. 2A, one, two, three, four, five, six, seven, eight, or more than eight fiducials 206 may be disposed on the object 202. Additionally, or alternatively, while in some instances the fiducials 206 may have uniform shape and size, it should be noted that the fiducials 206 may have varying shapes and sizes with respect to a given object 202 and/or across multiple objects. Variances in the placement, shape, size, and/or number of fiducials on a given object may assist in identifying and/or determining an identity of the object 202 and/or an object type, a shape of the object 202, and/or a location of the object 202 with respect to a surface.

In examples, the objects 202 may not include any computing components but instead may include only a frame portion, a tile portion, and/or both a frame portion and a tile portion. In other examples, the objects 202 may include one or more computing components, such as, for example, one or more processors, one or more network interfaces, memory, one or more sensors, one or more sound emitters, one or more microphones, one or more RFID tags, and/or one or more quick response (QR) codes. The processors may be the same as or similar to the processors 108 described with respect to FIG. 1 and may be configured to perform the same or similar functionality. The network interfaces may be the same as or similar to the network interfaces 110 described with respect to FIG. 1 and may be configured to perform the same or similar functionality. The memory may be the same as or similar to the memory 112 described with respect to FIG. 1 and may be configured to perform the same or similar functionality.

Additionally, or alternatively, the memory of the objects 202 may be configured with instructions that, when executed by the processors, may cause the processors to perform several operations. The operations may include, for example, sending data to one or more other objects, to a local device such as a mobile phone, a communal device, a television, or other electronic device capable of receiving data, and/or a remote system. The operations may additionally, or alternatively, include receiving data from one or more other objects, a local device, and/or a remote system. The operations may additionally, or alternatively, include causing the sensors to activate and/or deactivate. The operations may additionally, or alternatively, include causing the sound emitters to emit sound. The operations may additionally, or alternatively include causing the microphones to capture audio and/or generate corresponding audio data. The memory may additionally, or alternatively, be configured to store information associated with the object, such as, for example, data indicating an identity of the object, a shape of the object, one or more applications the object is associated with, one or more other objects associated with the object, and/or one or more devices the object is associated with. The operations may additionally, or alternatively, include sending data representing this information to one or more local and/or remote devices to assist in identification of the object, the shape of the object, and/or the location of the object.

The sensors of the objects 202 may include, for example, components that help determine the location of the objects 202 with respect to each other and/or with respect to a surface on which the objects 202 have been placed. These sensors may include proximity sensors, global positioning sensors, magnetic field sensors, infrared sensors, capacitance sensors, resistivity sensors, light sensors, tactile sensors, Bluetooth-related triangulation and/or trilateration, multiple Bluetooth-related antennas, and/or vibration sensors, for example.

The sound emitters may include, for example speakers, electromechanical buzzers, piezoelectric components, and/ or mechanical buzzers. The sound emitters may be configured to emit sound into an environment in which the objects 202 are disposed. The memory may include instructions that, when executed by the processors, may cause the processors to cause the sound emitters to emit sound. In other examples, one or more other devices, such as a touchscreen device and/or a projector device and/or a mobile device and/or a communal device and/or a remote system may cause the sound emitters to emit the sound. The sound emitted by the sound emitters may be constant or modulated. When modulated, the sound may be emitted in a repetitive pattern and/or randomly. In examples, the modulated sound may be unique to the object emitting the sound and this information may be utilized to determine the identity of the object. The sound may be emitted at a constant frequency and/or acoustic energy. Alternatively, the sound may be emitted at modulated frequencies and/or acoustic energies. The frequencies at which the sound is emitted may be in the audible sound range or may otherwise be audible to a human and/or the frequencies may be in inaudible sound ranges or may otherwise not be audible to a human.

The sound emitters may additionally, or alternatively, be configured to emit sound at specific times to assist in locating the objects 202. For example, a device associated with the surface on which the objects 202 have been placed may include microphones. The sound emitters may be caused to emit sound such that the microphones capture the sound and generate corresponding audio data. A time difference of arrival may be determined with respect to the microphones of the device. The time-difference-of-arrival information may be utilized to determine a location of the sound emitters of the objects 202, which may be utilized to determine a location of the objects 202.

Additionally, or alternatively, the sound emitters may be configured to emit sound corresponding to speech. For example, a communication channel may be established between the objects 202 and a far-end talker. A device associated with the far-end talker may capture audio representing speech by the far-end-talker and may generate corresponding audio data. That audio data may be sent to the objects 202 and audio corresponding to the audio data may be output via the sound emitters.

The microphones of the objects 202 may be configured to capture sound and generate corresponding audio data for processing and/or sending to other local and/or remote devices and systems. For example, when a communication channel has been established between the objects 202 and another device, the microphones may capture audio representing human speech and may generate corresponding audio data to be sent to the other device for output via a speaker of the other device. Additionally, or alternatively, the microphones may capture sound produced by the device associated with the surface on which the objects 202 have been placed and may generate corresponding audio data. That audio data may be processed to determine a location of the objects 202 with respect to the sound emitters of the surface device.

The objects 202 may additionally, or alternatively, include one or more RFID tags, which may also be described as RFID labels. In examples, the RFID tags are passive and do not contain a battery. In these examples, the RFID tags use radio energy transmitted by an RFID scanner, which may also be described as an RFID reader. In other examples, the RFID tags may be active and/or battery-assisted passive. An active RFID tag may include or be associated with a battery and may periodically transmit its identification signal. A battery-assisted passive RFID tag may have a battery and may be activated when an RFID scanner is within a given proximity of the RFID tag. RFID may use electromagnetic fields to identify and track RFID tags of the objects 202. The RFID tags may contain or be associated with stored information, which may include an identifier of the RFID tags and/or the objects 202 associated therewith, the shape of the objects 202, and/or other information associated with the arrangement of the objects 202, for example.

The objects 202 may additionally, or alternatively, include one or more QR codes, which may also be described as matrix barcodes. The QR codes may include a machine-readable optical label that contains information about the objects 202 to which the QR codes are associated. The QR codes may function in the same or a similar manner to the passive RFID tags described above. A given object 202 may include RFID tags, or QR codes, or both.

FIG. 2B illustrates a conceptual diagram of another example object on which touches may be detected with capacitive field tuning. A bottom view of the example object 204 is depicted in FIG. 2B. As shown, the object 204 may include one or more fiducials 208. Unlike the fiducial placement in FIG. 2A, the fiducials 208 shown in FIG. 2B may be spaced in a manner that does not mimic the shape of the object 204. Instead, the more random spacing and placement of the fiducials 208 may be utilized to uniquely identify the object 204 and/or to differentiate the object 204 from other objects. The shapes, sizes, spacing, heights, materials, and/or any other aspect of the fiducials 208 may differ with respect to each other and/or across objects and these differences may be identified and utilized to identify the object 204 and/or to determine characteristics associated with the object 204.

Figure 3:
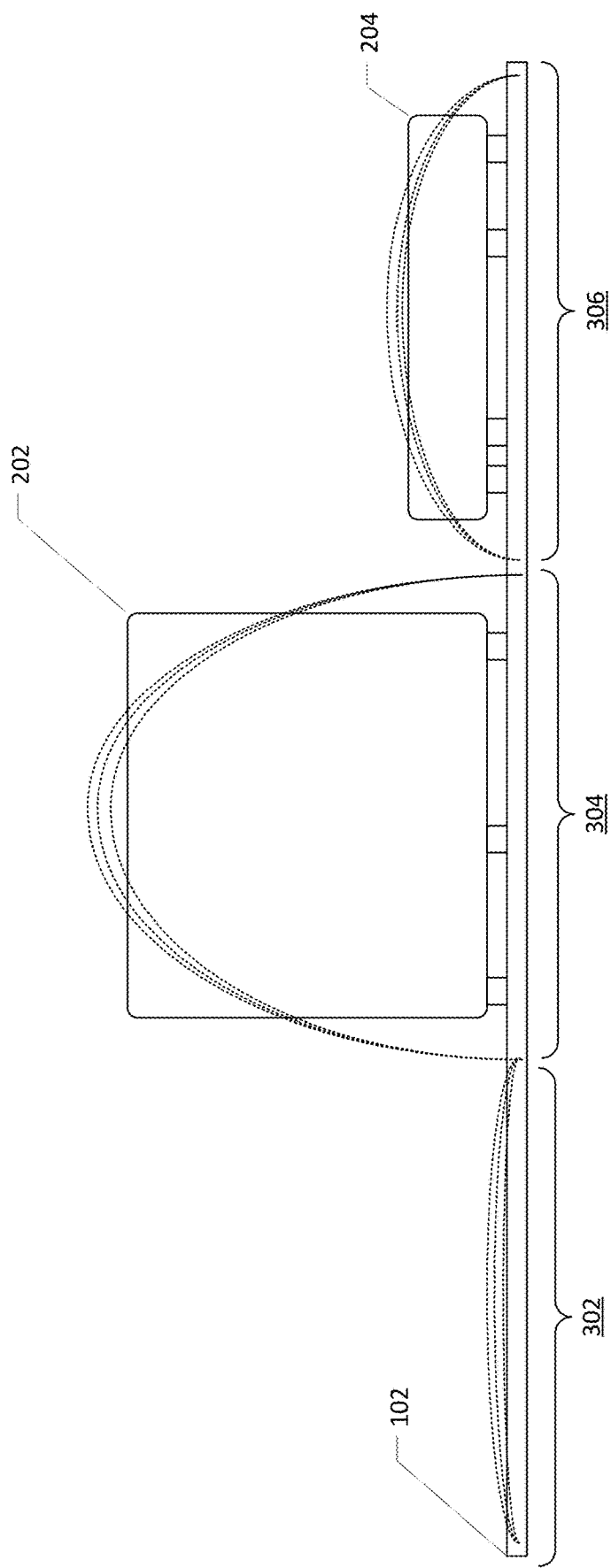
FIG. 3 illustrates a conceptual diagram of an example setup for capacitive field tuning of a touch-sensitive surface with multiple objects placed thereon.

FIG. 3 illustrates a conceptual diagram of an example setup for capacitive field tuning of a touch-sensitive surface with multiple objects placed thereon. FIG. 3 may include a device 102, which may be similar to the device 102 described with respect to FIG. 1. Additionally, FIG. 3 may include one or more objects 202, 204, which may be similar to the objects 202, 204 described with respect to FIGS. 2A and 2B. As shown in FIG. 3, two objects 202, 204 have been placed at different locations on a touch-sensitive surface of the device 102 such that a first portion 302 of the surface does not include an object, a second portion 304 of the surface includes the first object 202, and a third portion 306 of the surface includes the second object 204. Each of these three portions of the capacitive field associated with the surface may be tuned to allow for detection of touch input.

For example, with respect to the first portion 302 that does not include an object, one or more capacitive sensors of the device 102 may be tuned such that a touch is detected on a touch-sensitive surface of the device 102 when a user and/or object makes contact with the touch-sensitive surface. For example, one or more layers of a conductive mesh may be disposed in the device 102 along with one or more layers between the conductive mesh and the touch-sensitive surface. Those one or more layers may include various dielectrics, adhesives, conductive coatings, acrylic and/or glass layers, plastic layers, and the touch-sensitive surface itself. To determine when a user and/or object touches the touch-sensitive surface without detecting a touch prior to the user and/or object making contact with the surface, the capacitive field generated by the capacitive sensors may be tuned in one or more ways. For example, generally, an electric signal is sent through the conductive mesh and multiple signal receivers capture the signal after it runs through the conductive mesh. When no user and/or object is touching the surface, the electric signals are received at a certain strength. However, when a user and/or other conductive object enters the conductive field associated with the capacitive sensors, the mutual coupling between electrodes in a given row and column of the conductive mesh is altered. The alteration in mutual coupling may be measured by the capacitive sensor to determine when an object contacts, or nearly contacts, the surface and thus when to indicate that a touch has occurred. Given that the conductive mesh includes multiple electrode rows and columns, the mutual coupling alteration at given rows and columns and/or between rows and columns may allow for the determination of a location of the touch in question. Generally, various aspects of the capacitive sensor are tuned to allow for accurate detection of touch on the surface. Those aspects include an amplitude of the electrical signal applied to the electrodes, a frequency of the electrical signal applied to the electrodes, a gain setting associated with receiving the electrical signal at the receivers, an amount of charge applied to the electrodes, and/or thresholds associated with determining when a mutual coupling alteration is interpreted as a touch or not. The tuning of these aspects may be based at least in part on a distance between the touch-sensitive surface and the conductive mesh as well as signal impedance characteristics of the touch-sensitive surface and/or the layers of material between the surface and the conductive mesh. These aspects of the capacitive sensor are generally tuned prior to a user acquiring the electronic device in question such that the user may utilize the touch-sensitive surface during a first use of the device. The tuning of such devices then may remain constant or otherwise fixed. A such, with respect to the first portion 302 of the surface that does not include an object, the tuning of the capacitive sensor at the first portion 302 may be associated with tuning settings that are typical of a touch-sensitive surface such that the capacitive field extends to the touch-sensitive surface.

With respect to the second portion 304 of the surface, because the first object 202 placed on the surface has a given thickness and signal impedance, detection of touches on the object 202 may not occur and/or may be inaccurate. To detect touches on objects placed on touch-sensitive surfaces, the capacitive field associated with the location of the object 202 on the surface may be tuned such that the capacitive field extends to the touch surface of the object 202 while the object 202 is disposed on the touch-sensitive surface of the device 102. Doing so may allow for detection of touches on the object 202 while the object 202 is placed on the device surface, and may allow the capacitive field to return to its original tuning for detecting touches on the device surface when the object 202 is removed from the location.

In examples, the object 202 may include one or more fiducials that may be disposed on the device 102 such that the fiducials may contact the touch-sensitive surface when the object 202 is placed on the device 102. The fiducials may be arranged in a unique and/or predesignated manner. The fiducials may also have unique and/or predesignated shapes. An object identification component may utilize the characteristics of the touch input corresponding to the fiducials to identify the object and/or an object type of the object, as described more fully with respect to FIG. 1.

A characteristics database may determine whether an object identifier for the object 202 is present in the characteristics database. When present, the characteristics database may retrieve the signal impedance characteristics data for the object identifier and may return the signal impedance characteristics data to the object identification component and/or may provide the signal impedance characteristics data to a tuning component. Additionally, a location component may determine a location of the object 202 on the touch-sensitive surface as well as an approximate area of the object 202. For example, as noted above, the location of the touch inputs from the fiducials may be utilized to determine an approximate location of the object 202 on the touch-sensitive surface. Additionally, identification of the object 202 by the object identification component may include determining an area and/or shape of the object.

A tuning component may be configured to receive the signal impedance characteristics data, the object identifier, and/or the location data and to determine how the capacitive field should be tuned to allow for detection of touches on the object. For example, when the signal impedance characteristics data indicates gain settings, signal amplitude settings, signal frequency settings, an amount of charge to apply, or other settings associated with the capacitive sensor, the tuning component may cause those settings to be applied to the capacitive sensor for an area of the touch-sensitive surface corresponding to the area where the object 202 is disposed. In other examples, when the signal impedance characteristics data indicates the thickness of the object 202 and/or the material of the object 202, the tuning component may determine the capacitive sensor settings to be applied based at least in part on the signal impedance characteristics data, as described more fully elsewhere herein.

With respect to the third portion 306 of the surface from FIG. 3, multiple objects are placed on the touch-sensitive surface of the device 102 at the same time. In these examples, the tuning component may be configured to determine how to tune the capacitive field as to each object 202, 204. For example, the techniques described herein may be utilized to tune the second portion 304 of the capacitive sensor to detect touches on the first object 202 surface having first characteristics such as a first height. Additionally, the techniques described herein may be utilized to tune the third portion 306 of the capacitive sensor to detect touches on the second object 204 surface having second characteristics such as a second height that differs from the first height. By so doing, touch input may be detected on the first object 202, on the second object 204, and on areas of the touch-sensitive surface not occupied by the first object 202 or the second object 204, all at the same time. As shown in FIG. 3, the height and/or other characteristics associated with the first object 202 inform the tuning component to extend the capacitive field in the second portion 304 of the surface further from the surface than the capacitive field in the third portion 306 of the surface, which is associated with the second object 204 that is thinner and/or otherwise has characteristics that require the capacitive field to not extend as far from the surface as the first object 202.

Figure 4:
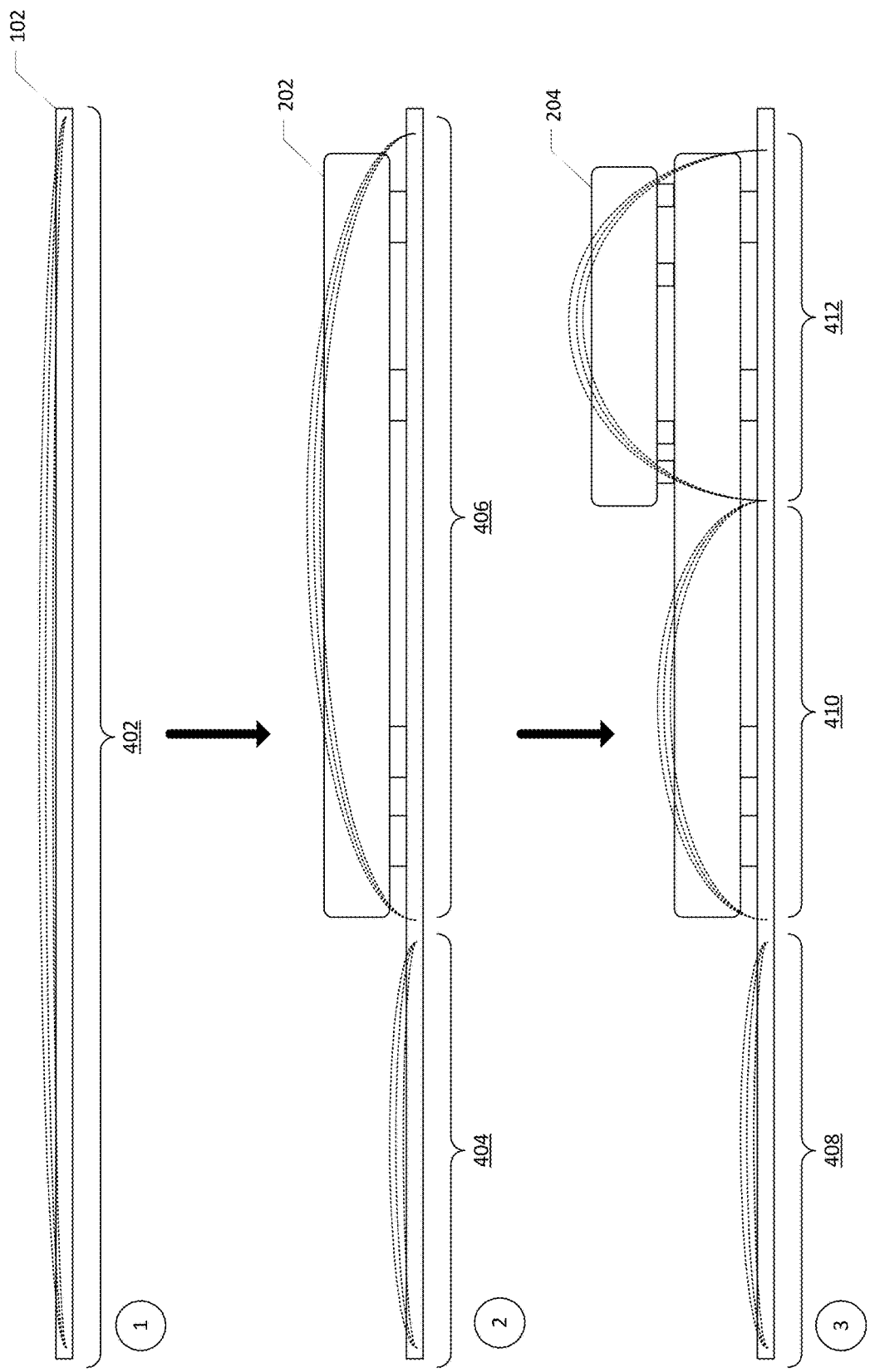
FIG. 4 illustrates a conceptual diagram of how a capacitive field may be tuned dynamically as objects are placed.

FIG. 4 illustrates a conceptual diagram of how a capacitive field may be tuned dynamically as objects are placed thereon. FIG. 4 may include a device 102, which may be similar to the device 102 described with respect to FIG. 1. FIG. 4 may also include one or more objects 202, 204, which may be similar to the objects 202, 204 described with respect to FIG. 2. FIG. 4 shows a progression from top to bottom where a device 102 starts without an object placed thereon. The progression also includes the placement of a first object 202 on the touch-sensitive surface of the device 102 and then the placement of a second object 204 on the first object 202. FIG. 4 illustrates how the capacitive field of the device 102 is changed as the progression proceeds.

Starting at step 1, one or more layers of a conductive mesh may be disposed in the device 102 along with one or more layers between the conductive mesh and the touch-sensitive surface. Those one or more layers may include various dielectrics, adhesives, conductive coatings, acrylic and/or glass layers, plastic layers, and the touch-sensitive surface itself. To determine when a user and/or object touches the touch-sensitive surface without detecting a touch prior to the user and/or object making contact with the surface, the capacitive field generated by the capacitive sensors may be tuned in one or more ways. For example, generally, an electric signal is sent through the conductive mesh and multiple signal receivers capture the signal after it runs through the conductive mesh. When no user and/or object is touching the surface, the electric signals are received at a certain strength. However, when a user and/or other conductive object enters the conductive field associated with the capacitive sensors, the mutual coupling between electrodes in a given row and column of the conductive mesh is altered. The alteration in mutual coupling may be measured by the capacitive sensor to determine when an object contacts, or nearly contacts, the surface and thus when to indicate that a touch has occurred. Given that the conductive mesh includes multiple electrode rows and columns, the mutual coupling alteration at given rows and columns and/or between rows and columns may allow for the determination of a location of the touch in question. Generally, various aspects of the capacitive sensor are tuned to allow for accurate detection of touch on the surface. Those aspects include an amplitude of the electrical signal applied to the electrodes, a frequency of the electrical signal applied to the electrodes, a gain setting associated with receiving the electrical signal at the receivers, an amount of charge applied to the electrodes, and/or thresholds associated with determining when a mutual coupling alteration is interpreted as a touch or not. The tuning of these aspects may be based at least in part on a distance between the touch-sensitive surface and the conductive mesh as well as signal impedance characteristics of the touch-sensitive surface and/or the layers of material between the surface and the conductive mesh. These aspects of the capacitive sensor are generally tuned prior to a user acquiring the electronic device in question such that the user may utilize the touch-sensitive surface during a first use of the device 102. In this example, a first portion 402 of the surface may include the entirety of the surface and the capacitive field may be the same and/or similar across the entire surface.

At step 2, the first object 202 is placed on the device 102. Because the first object 202 placed on the surface has a given thickness and signal impedance, detection of touches on the object 202 may not occur and/or may be inaccurate. To detect touches on objects placed on touch-sensitive surfaces, the capacitive field associated with the location of the object 202 on the surface may be tuned such that the capacitive field extends to the touch surface of the object 202 while the object 202 is disposed on the touch-sensitive surface of the device 102. Doing so may allow for detection of touches on the object 202 while the object 202 is placed on the device surface, and may allow the capacitive field to return to its original tuning for detecting touches on the device surface when the object 202 is removed from the location.

In examples, the object 202 may include one or more fiducials that may be disposed on the device 102 such that the fiducials may contact the touch-sensitive surface when the object 202 is placed on the device 102. The fiducials may be arranged in a unique and/or predesignated manner. The fiducials may also have unique and/or predesignated shapes. An object identification component may utilize the characteristics of the touch input corresponding to the fiducials to identify the object and/or an object type of the object, as described more fully with respect to FIG. 1.

A characteristics database may determine whether an object identifier for the object 202 is present in the characteristics database. When present, the characteristics database may retrieve the signal impedance characteristics data for the object identifier and may return the signal impedance characteristics data to the object identification component and/or may provide the signal impedance characteristics data to a tuning component. Additionally, a location component may determine a location of the object 202 on the touch-sensitive surface as well as an approximate area of the object 202. For example, as noted above, the location of the touch inputs from the fiducials may be utilized to determine an approximate location of the object 202 on the touch-sensitive surface. Additionally, identification of the object 202 by the object identification component may include determining an area and/or shape of the object.

A tuning component may be configured to receive the signal impedance characteristics data, the object identifier, and/or the location data and to determine how the capacitive field should be tuned to allow for detection of touches on the object. For example, when the signal impedance characteristics data indicates gain settings, signal amplitude settings, signal frequency settings, an amount of charge to apply, or other settings associated with the capacitive sensor, the tuning component may cause those settings to be applied to the capacitive sensor for an area of the touch-sensitive surface corresponding to the area where the object 202 is disposed. In other examples, when the signal impedance characteristics data indicates the thickness of the object 202 and/or the material of the object 202, the tuning component may determine the capacitive sensor settings to be applied based at least in part on the signal impedance characteristics data, as described more fully elsewhere herein. As shown at step 2, a second portion 404 of the surface may not include an object and thus the capacitive field at the second 404 may be the same or similar to the capacitive field at the first portion 402 of the surface as described with respect to step 1. Additionally, a third portion 406 of the surface that includes the first object 202 may have its capacitive field tuned such that touches are detected on the first object 202.

At step 3, the second object 204 may be placed on the first object 202 or otherwise stacked. The tuning component may be configured to tune the capacitive sensor when multiple objects are stacked on each other. For example, given that the capacitive sensor was tuned to detect touches on the surface of the first object 202, the capacitive sensor may detect fiducials from the second object 204 touching the first object 202. The second object 204 may be identified and the capacitive sensor may be tuned at the location of the second object 204 based on that object's signal impedance characteristics and/or a combination of the signal impedance characteristics of the first object 202 and the second object 204. Thereafter, touch input may be detected on the surface of the second object 204 as stacked on the first object 202. For example, a fourth portion 408 of the surface that does not include an object may be tuned in a manner consistent with the first portion 402 as described with respect to step 1. Additionally, a fifth portion 410 of the surface that includes just the first object 202 and/or a portion of just the first object 202 may be tuned in a manner consistent with the third portion 306 as described with respect to step 2. Furthermore, a sixth portion 412 of the surface that includes the first object 202 and the second object 204 may be tuned such that the capacitive field extends to a surface of the second object 204 where touch input may be received.

Figure 5:
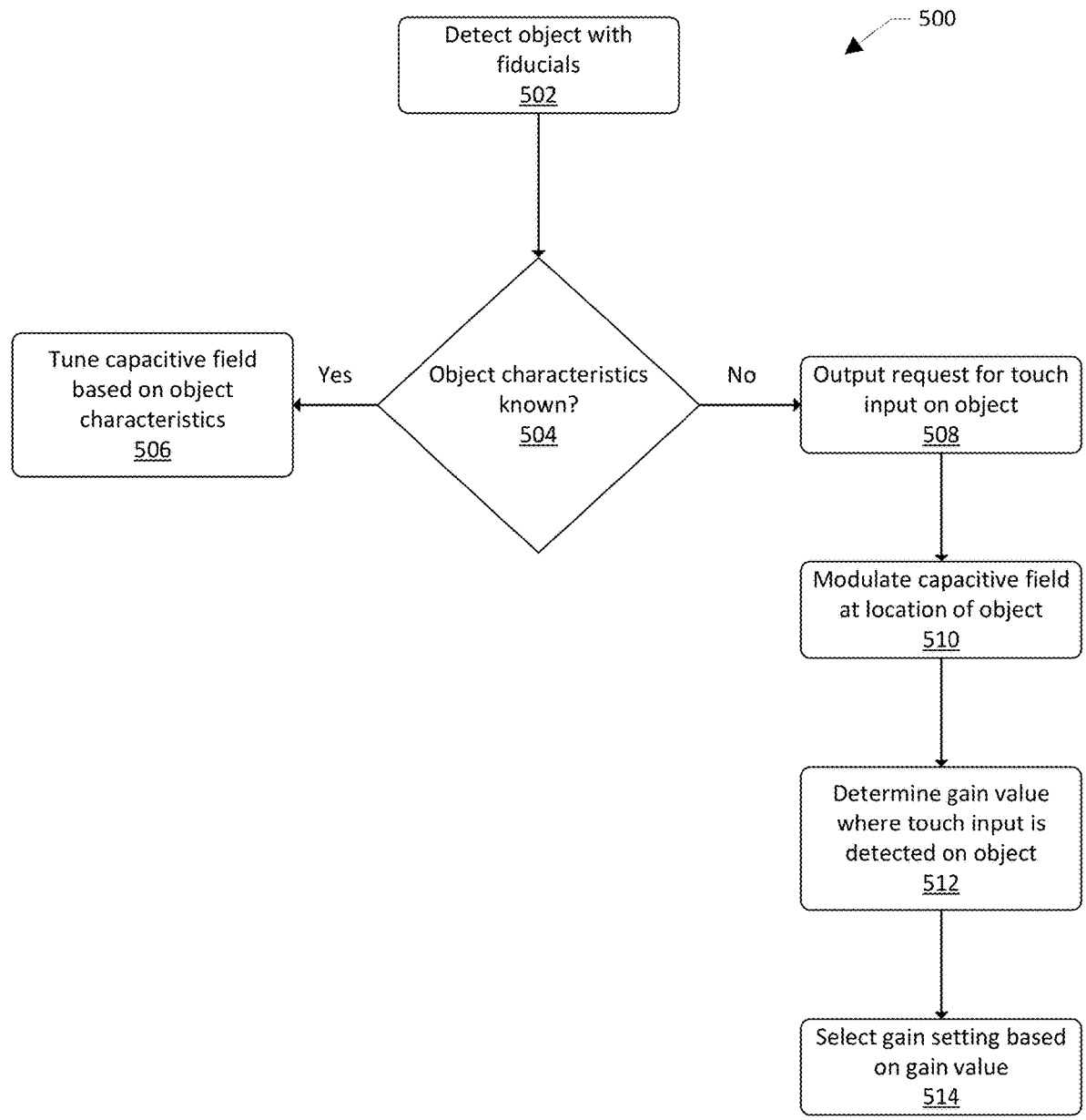
FIG. 5 illustrates a flow diagram of an example process for dynamic capacitive field tuning.

FIG. 5 illustrates processes for capacitive field tuning for detecting touches on objects. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4, and 6-10, although the processes may be implemented in a wide variety of other environments, architectures and systems.

FIG. 5 illustrates a flow diagram of an example process 500 for dynamic capacitive field tuning. The order in which the operations or steps are described is not intended to be construed as a limitation, and any number of the described operations may be combined in any order and/or in parallel to implement process 500.

At block 502, the process 500 may include detecting an object that may include fiducials as placed on a touch-sensitive surface of a device. The fiducials may be arranged in a unique and/or predesignated manner. The fiducials may also have unique and/or predesignated shapes. A object identification component of the device and/or a system associated with the device may utilize the characteristics of the touch input corresponding to the fiducials to identify the object and/or an object type of the object. For example, a first object may have eight fiducials that are arranged in two rectangular patterns. Four of the fiducials of the first object may be larger than the other four fiducials of the first object. These characteristics may be utilized by the object identification component of the device and/or the system to identify the first object. The object identification component may generate an indicator of the object and/or provide that indicator to a characteristics database along with request data to return signal impedance characteristics associated with the object.

At block 504, the process 500 may include determining whether characteristics of the object are known. For example, the characteristics database may receive the request data and determine whether an object identifier for the object is present in the characteristics database. When present, the characteristics database may retrieve the signal impedance characteristics data for the device identifier and may return the signal impedance characteristics data to the object identification component and/or may provide the signal impedance characteristics data to a tuning component. Example signal impedance characteristics data may include a thickness of the object, a material that the object is made of, a gain setting of the capacitive sensor to be applied, a signal amplitude and/or a signal frequency to be applied, and/or any other data that may indicate how an electrical signal from the capacitive sensor may be impeded by the object and/or how the mutual coupling alteration may occur when a touch is received on the object.

In examples where the characteristics of the object are known, the process 500 may include, at block 506, tuning the capacitive field based at least in part on the characteristics. For example, the tuning component may be configured to receive the signal impedance characteristics data, the object identifier, and/or location data and to determine how the capacitive field should be tuned to allow for detection of touches on the object. For example, when the signal impedance characteristics data indicates gain settings, signal amplitude settings, signal frequency settings, an amount of charge to apply, or other settings associated with the capacitive sensor, the tuning component may cause those settings to be applied to the capacitive sensor for an area of the touch-sensitive surface corresponding to the area where the object is disposed. In other examples, when the signal impedance characteristics data indicates the thickness of the object and/or the material of the object, the tuning component may determine the capacitive sensor settings to be applied based at least in part on the signal impedance characteristics data. Determining the capacitive sensor settings may be performed by analyzing the features of the object in association with known settings associated with those features. Determining the capacitive sensor settings may also be performed utilizing one or more modeling techniques, such as machine learning models, as will be described in more detail below. The tuning component may be configured to apply the settings as described herein to certain electrodes of the capacitive mesh. For example, each electrode row and electrode column may be given an identifier, and the rows and columns that are associated with the area and location of the object may be tuned based at least in part on the settings such that the capacitive field extends from the touch-sensitive surface to the surface of the object. It should be understood that the surface of the object that may receive touch input from the user and/or another object may be described herein as the opposing surface from the touch-sensitive surface of the device. As such, a surface of the object that is proximal to the touch-sensitive surface of the device may include the one or more fiducials, while a distal surface of the object may be the opposing surface and/or opposing side of the object relative to the proximal surface.

In examples where the characteristics of the object are not known, the process 500 may include, at block 508, outputting a request for touch input to be provided on the object. The request may be in the form of an audible request, a visual request, and/or other presentation that instructs the user to provide touch input to the object.

At block 510, the process 500 may include modulating the capacitive field at the location of the object. Modulation of the capacitive field may include altering the tuning settings as described herein across a spectrum associated with each setting. Each of the settings may be changed over a period of time where the user provides the user input.

At block 512, the process 500 may include determining a gain value where the touch input is detected on the object. For example, as the gain value is changed during the modulation, the change in received signal across electrodes may be measured. As a given point during modulation of the gain value, the received signals may indicate that a touch is detected in a manner similar to how a touch would be detected on the touch-sensitive surface. This gain value may be indicated as corresponding to detection of a touch on the object. It should be understood that while the gain value is utilized herein by way of example as one of the modulated tuning settings, some or all of the other tuning settings described herein may be modulated and values of those aspects of the capacitive sensor may be determined and utilized to determine when those values indicate detection of a touch.

At block 514, the process 500 may include selecting a gain setting based at least in part on the gain value. For example, the determined gain setting and/or range of gain settings indicating detection of a touch on the object may be utilized to set the gain of the capacitive sensor to correspond to the gain value. Additionally, the one or more other tuning settings may be set based on the results of the modulation described above. These tuning settings may be applied to the capacitive sensor such that the capacitive field extends from the touch-sensitive surface to the touch surface of the object at a location of the object.

Figure 6:
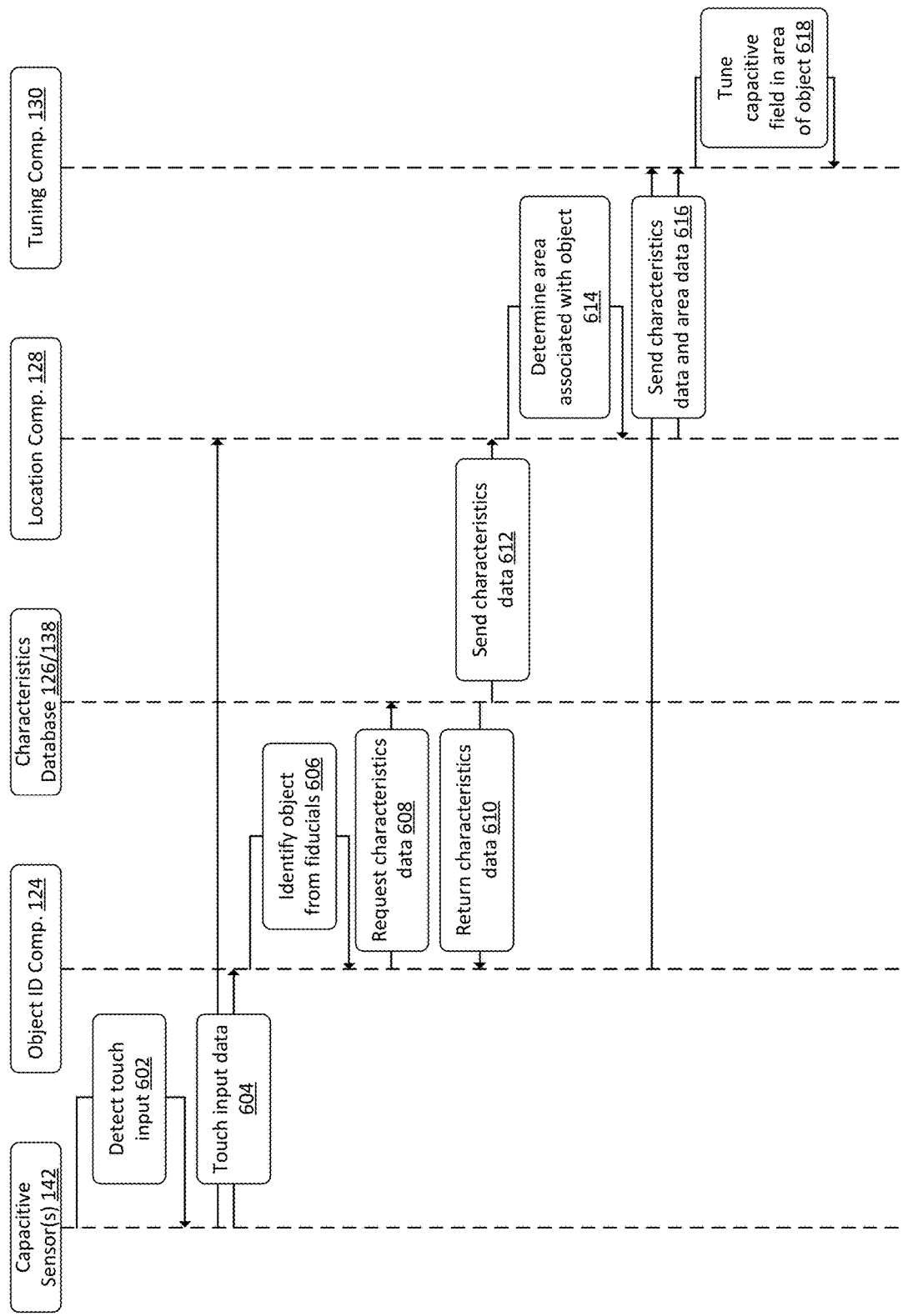
FIG. 6 illustrates a sequence diagram of an example process for capacitive field tuning for detecting touches on objects.

FIG. 6 illustrates a sequence diagram of an example process for capacitive field tuning for detecting touches on objects. It should be understood that the example processes described in FIG. 6 are provided in an illustrative order, but that the processes may be performed in other orders and/or in parallel.

At block 602, one or more capacitive sensors 142 of the device 102 may detect touch input on a touch-sensitive surface of the device 102. For example, one or more layers of a conductive mesh may be disposed in the device 102 along with one or more layers between the conductive mesh and the touch-sensitive surface. Those one or more layers may include various dielectrics, adhesives, conductive coatings, acrylic and/or glass layers, plastic layers, and the touch-sensitive surface itself. To determine when a user and/or object touches the touch-sensitive surface without detecting a touch prior to the user and/or object making contact with the surface, the capacitive field generated by the capacitive sensors may be tuned in one or more ways. For example, generally, an electric signal is sent through the conductive mesh and multiple signal receivers capture the signal after it runs through the conductive mesh. When no user and/or object is touching the surface, the electric signals are received at a certain strength. However, when a user and/or other conductive object enters the conductive field associated with the capacitive sensors, the mutual coupling between electrodes in a given row and column of the conductive mesh is altered. The alteration in mutual coupling may be measured by the capacitive sensor to determine when an object contacts, or nearly contacts, the surface and thus when to indicate that a touch has occurred. Given that the conductive mesh includes multiple electrode rows and columns, the mutual coupling alteration at given rows and columns and/or between rows and columns may allow for the determination of a location of the touch in question. Generally, various aspects of the capacitive sensor are tuned to allow for accurate detection of touch on the surface. Those aspects include an amplitude of the electrical signal applied to the electrodes, a frequency of the electrical signal applied to the electrodes, a gain setting associated with receiving the electrical signal at the receivers, an amount of charge applied to the electrodes, and/or thresholds associated with determining when a mutual coupling alteration is interpreted as a touch or not. The tuning of these aspects may be based at least in part on a distance between the touch-sensitive surface and the conductive mesh as well as signal impedance characteristics of the touch-sensitive surface and/or the layers of material between the surface and the conductive mesh. These aspects of the capacitive sensor are generally tuned prior to a user acquiring the electronic device in question such that the user may utilize the touch-sensitive surface during a first use of the device 102.

At block 604, the capacitive sensors 142 may send touch input data corresponding to the touch input to an object identification component 124 and/or to a location component 128. For example, the touch input data may indicate the row and column electrodes where the capacitive field was disrupted by the fiducials touching the touch-sensitive surface.

At block 606, the object identification component 124 may identify an object placed on the touch-sensitive surface from fiducials of the object. For example, the object identification component of the device and/or a system associated with the device may utilize the characteristics of the touch input corresponding to the fiducials to identify the object and/or an object type of the object. For example, a first object may have eight fiducials that are arranged in two rectangular patterns. Four of the fiducials of the first object may be larger than the other four fiducials of the first object. These characteristics may be utilized by the object identification component of the device and/or the system to identify the first object.

At block 608, the object identification component 124 may request characteristics data associated with the object from a characteristics database 126. For example, the object identification component 124 may generate an indicator of the object and/or provide that indicator to the characteristics database 126 along with request data to return signal impedance characteristics associated with the object.

At block 610, the characteristics database 126 may return the characteristics data to the object identification component 124. For example, the characteristics database 126 may receive the request data and determine whether an object identifier for the object is present in the characteristics database 126. When present, the characteristics database 126 may retrieve the signal impedance characteristics data for the object identifier and may return the signal impedance characteristics data to the object identification component 124 and/or may provide the signal impedance characteristics data to the tuning component 130. Example signal impedance characteristics data may include a thickness of the object, a material that the object is made of, a gain setting of the capacitive sensor to be applied, a signal amplitude and/or a signal frequency to be applied, and/or any other data that may indicate how an electrical signal from the capacitive sensor may be impeded by the object and/or how the mutual coupling alteration may occur when a touch is received on the object.

At block 612, the characteristics database 126 may also send the characteristics data to the location component 128. For example, the location component 128 may determine a location of the object on the touch-sensitive surface as well as an approximate area of the object. For example, as noted above, the location of the touch inputs from the fiducials may be utilized to determine an approximate location of the object on the touch-sensitive surface. Additionally, identification of the object by the object identification component may include determining an area and/or shape of the object.

At block 614, the location component 128 may determine an area of the touch-sensitive surface that is associated with the object. For example, a given object identifier may indicate that the corresponding object is a rectangle or a circle and that the object has certain dimensions, such as a rectangle having a length of approximately 5 centimeters and a width of approximately 2 centimeters, and/or a circle having a radius of 4 centimeters. The location component 128 may utilize this information to determine which portion of the touch-sensitive surface corresponds to where the object is located. The location component 128 may also be utilized to determine when the location of the object changes, such as when the object is moved on the touch-sensitive surface.

At block 616, the object identification component 124 and/or the location component 128 may send the characteristics data of the object and/or the location data to a tuning component 130. By so doing, the tuning component 130 may be provided with data for determining how to tune the capacitive field and in what location of the touch-sensitive surface to perform the tuning.

At block 618, the tuning component 130 may tune the capacitive field in the area of the object. For example, the tuning component may be configured to receive the signal impedance characteristics data, the object identifier, and/or the location data and to determine how the capacitive field should be tuned to allow for detection of touches on the object. For example, when the signal impedance characteristics data indicates gain settings, signal amplitude settings, signal frequency settings, an amount of charge to apply, or other settings associated with the capacitive sensor, the tuning component may cause those settings to be applied to the capacitive sensor for an area of the touch-sensitive surface corresponding to the area where the object is disposed. In other examples, when the signal impedance characteristics data indicates the thickness of the object and/or the material of the object, the tuning component may determine the capacitive sensor settings to be applied based at least in part on the signal impedance characteristics data. Determining the capacitive sensor settings may be performed by analyzing the features of the object in association with known settings associated with those features. Determining the capacitive sensor settings may also be performed utilizing one or more modeling techniques, such as machine learning models, as will be described in more detail below. The tuning component may be configured to apply the settings as described herein to certain electrodes of the capacitive mesh. For example, each electrode row and electrode column may be given an identifier, and the rows and columns that are associated with the area and location of the object may be tuned based at least in part on the settings such that the capacitive field extends from the touch-sensitive surface to the surface of the object. It should be understood that the surface of the object that may receive touch input from the user and/or another object may be described herein as the opposing surface from the touch-sensitive surface of the device. As such, a surface of the object that is proximal to the touch-sensitive surface of the device may include the one or more fiducials, while a distal surface of the object may be the opposing surface and/or opposing side of the object relative to the proximal surface.

Once the capacitive field is tuned as described herein, touches on object surfaces may be detected. For example, in examples where a projection device is being utilized, detection of the object on the touch-sensitive surface may cause one or more images to be displayed on the touch-sensitive surface. The images may differ in the area of the touch-sensitive surface that corresponding to the location where the object is placed and/or where touch is detected on one or more surfaces of the object.

In addition to the capacitive field tuning described herein, the use of computer vision and/or IR sensing, as described more fully below, can be utilized to detect touches and/or to determine actions to take in response to detecting certain touches, objects, movements, etc. For example, to sense interactions, a device may include an emitter and a sensor. The emitter may broadcast a plane of light across a space for sensing inputs of a user. The sensor may detect the touch or interactions through the scattering of IR light as the user breaks, or crosses, the plane of light. That is, as the user works on, for example, a piece of homework, the location of the input may be sensed by the sensor detecting the scattering of light. In turn, the device may transmit data to another device. The capacitive touch sensing described herein can be utilized to inform the detection of touches by the IR sensor(s), and/or the IR sensor data can be utilized to inform the detection of touches by the capacitive touch sensors. In examples, the tuning of the capacitive field at a location of an object to a certain height above the touch-sensitive surface may be utilized to change the plane of IR light. Likewise, the capacitive field tuning and the operations associated therewith such as the use of fiducials to identify objects may be utilized along with the computer vision techniques to more accurately identify objects, determine object characteristics, and otherwise configure the device(s) to detect objects and/or touches on objects.

Figure 7:
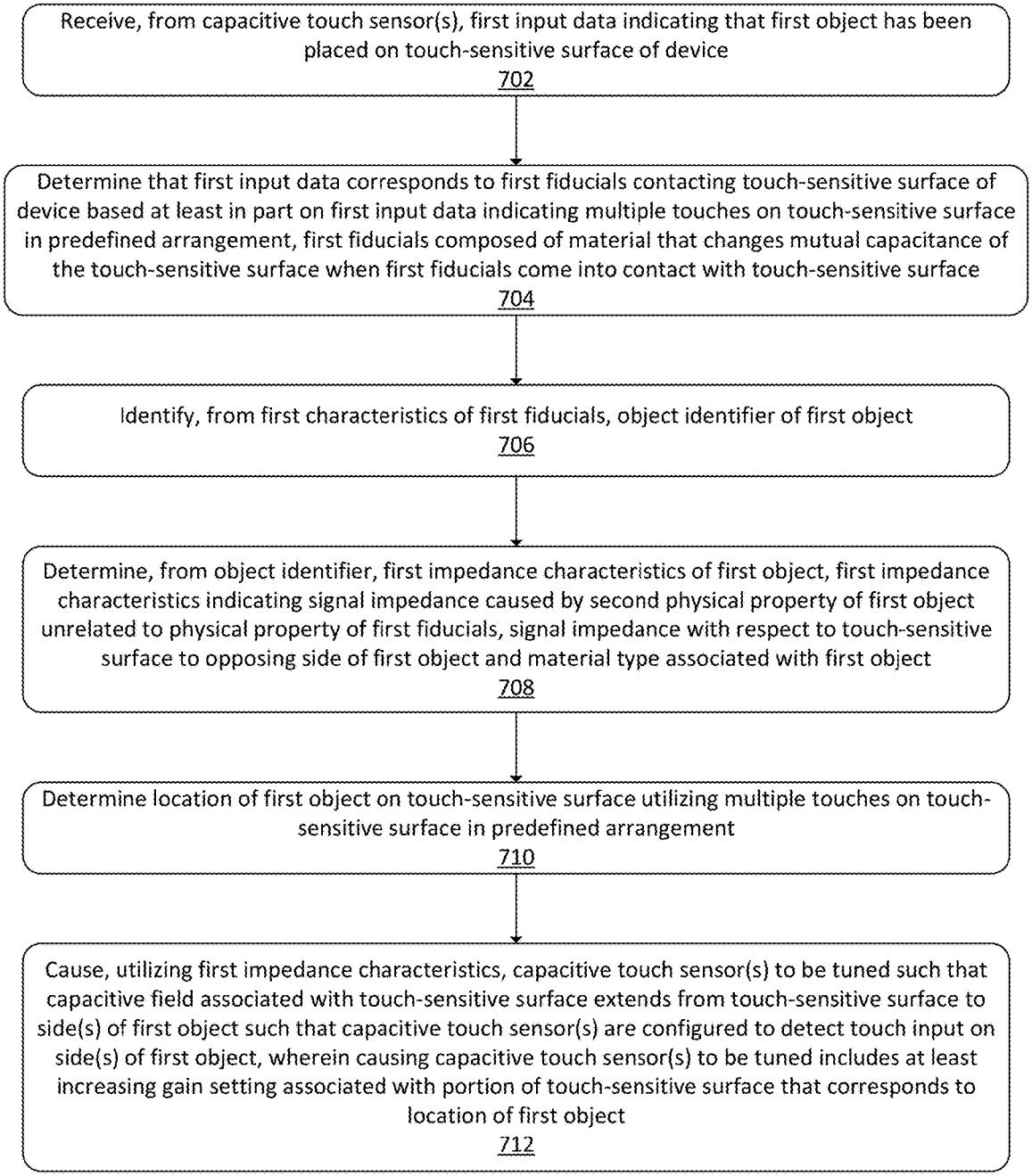
FIG. 7 illustrates a flow diagram of an example process for capacitive field tuning for detecting touches on objects.
Figure 8:
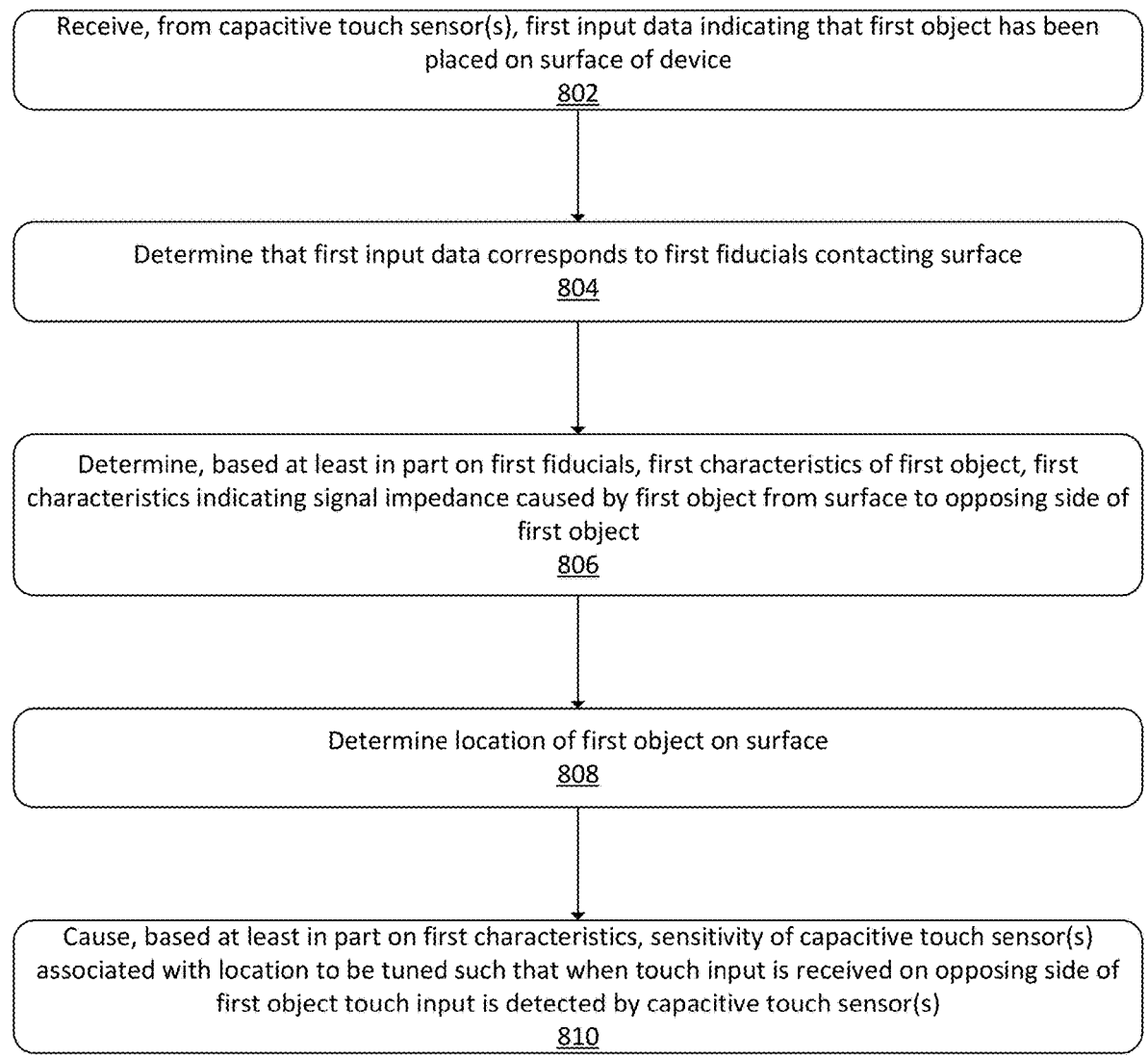
FIG. 8 illustrates a flow diagram of another example process for capacitive field tuning for detecting touches on objects.

FIGS. 7 and 8 illustrate processes for capacitive field tuning for detecting touches on objects. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6, 9, and 10, although the processes may be implemented in a wide variety of other environments, architectures and systems.

FIG. 7 illustrates a flow diagram of an example process 700 for capacitive field tuning for detecting touches on objects. The order in which the operations or steps are described is not intended to be construed as a limitation, and any number of the described operations may be combined in any order and/or in parallel to implement process 700.

At block 702, the process 700 may include receiving, from one or more capacitive touch sensors, first input data indicating that a first object has been placed on a touch-sensitive surface of the device. For example, one or more layers of a conductive mesh may be disposed in the device along with one or more layers between the conductive mesh and the touch-sensitive surface. Those one or more layers may include various dielectrics, adhesives, conductive coatings, acrylic and/or glass layers, plastic layers, and the touch-sensitive surface itself. To determine when a user and/or object touches the touch-sensitive surface without detecting a touch prior to the user and/or object making contact with the surface, the capacitive field generated by the capacitive sensors may be tuned in one or more ways. For example, generally, an electric signal is sent through the conductive mesh and multiple signal receivers capture the signal after it runs through the conductive mesh. When no user and/or object is touching the surface, the electric signals are received at a certain strength. However, when a user and/or other conductive object enters the conductive field associated with the capacitive sensors, the mutual coupling between electrodes in a given row and column of the conductive mesh is altered. The alteration in mutual coupling may be measured by the capacitive sensor to determine when an object contacts, or nearly contacts, the surface and thus when to indicate that a touch has occurred. Given that the conductive mesh includes multiple electrode rows and columns, the mutual coupling alteration at given rows and columns and/or between rows and columns may allow for the determination of a location of the touch in question. Generally, various aspects of the capacitive sensor are tuned to allow for accurate detection of touch on the surface. Those aspects include an amplitude of the electrical signal applied to the electrodes, a frequency of the electrical signal applied to the electrodes, a gain setting associated with receiving the electrical signal at the receivers, an amount of charge applied to the electrodes, and/or thresholds associated with determining when a mutual coupling alteration is interpreted as a touch or not. The tuning of these aspects may be based at least in part on a distance between the touch-sensitive surface and the conductive mesh as well as signal impedance characteristics of the touch-sensitive surface and/or the layers of material between the surface and the conductive mesh.

At block 704, the process 700 may include determining that the first input data corresponds to first fiducials contacting the touch-sensitive surface of the device based at least in part on the first input data indicating multiple touches on the touch-sensitive surface in a predefined arrangement, the first fiducials composed of a material that changes a mutual capacitance of the touch-sensitive surface when the first fiducials come into contact with the touch-sensitive surface. For example, the first input data may indicate that multiple touch inputs are received at the same time on the touch-sensitive surface, as well as information about those touch inputs, such as a number of inputs, spacing between inputs, input shapes, etc. This information may be utilized to determine that the touch input corresponds to first fiducials contacting the surface, as opposed to a user touching the surface and/or another object such as a stylus touching the surface. In examples where the capacitive field is tuned such that touches on a surface of the object may be detected, the device may be tuned such that the touches associated with the fiducials may be ignored or otherwise considered such that the touches by the fiducials do not interrupt detection of touches on the object itself. To do so, a first mutual capacitance between a transmitter electrode and a receiver electrode may be measured when the object is placed on the touch-sensitive surface. This first mutual capacitance may be defined as an initial mutual capacitance and may be measured against mutual capacitances detected when a touch is provided to the object itself. As described elsewhere herein in more detail, when an object enters the capacitive field and makes contact with the surface of the object, the mutual capacitance from when only the object was on the surface may change, and specifically may decrease. This mutual capacitance difference before and after the touch on the object may be measured to determine whether a touch input has been received on the object.

At block 706, the process 700 may include identifying, from first characteristics of the first fiducials, an object identifier of the first object. For example, an object identification component of the device and/or a system associated with the device may utilize the characteristics of the touch input corresponding to the fiducials to identify the object and/or an object type of the object. For example, a first object may have eight fiducials that are arranged in two rectangular patterns. Four of the fiducials of the first object may be larger than the other four fiducials of the first object. These characteristics may be utilized by the object identification component of the device and/or the system to identify the first object.

At block 708, the process 700 may include determining, from the object identifier, first impedance characteristics of the first object, the first impedance characteristics indicating signal impedance caused by a second physical property of the first object unrelated to a physical property of the first fiducials, the signal impedance with respect to the touch-sensitive surface to an opposing side of the first object and a material type associated with the first object. For example, the object identification component may generate an indicator of the object and/or provide that indicator to a characteristics database along with request data to return signal impedance characteristics associated with the object. The characteristics database may receive the request data and determine whether an object identifier for the object is present in the characteristics database. When present, the characteristics database may retrieve the signal impedance characteristics data for the object identifier and may return the signal impedance characteristics data to the object identification component and/or may provide the signal impedance characteristics data to a tuning component. Example signal impedance characteristics data may include a thickness of the object, a material that the object is made of, a gain setting of the capacitive sensor to be applied, a signal amplitude and/or a signal frequency to be applied, and/or any other data that may indicate how an electrical signal from the capacitive sensor may be impeded by the object and/or how the mutual coupling alteration may occur when a touch is received on the object.

At block 710, the process 700 may include determining a location of the first object on the touch-sensitive surface utilizing the multiple touches on the touch-sensitive surface in the predefined arrangement. For example, a given object identifier may indicate that the corresponding object is a rectangle or a circle and that the object has certain dimensions, such as a rectangle having a length of approximately 5 centimeters and a width of approximately 2 centimeters, and/or a circle having a radius of 4 centimeters. The location component may utilize this information to determine which portion of the touch-sensitive surface corresponds to where the object is located. The location component may also be utilized to determine when the location of the object changes, such as when the object is moved on the touch-sensitive surface.

At block 712, the process 700 may include causing, utilizing the first impedance characteristics, the capacitive touch sensor(s) to be tuned such that a capacitive field associated with the touch-sensitive surface extends from the touch-sensitive surface to one or more sides of the first object such that the capacitive touch sensor is configured to detect touch input on the one or more sides of the first object, wherein causing the capacitive touch sensor to be tuned includes at least increasing a gain setting associated with the portion of the touch-sensitive surface that corresponds to the location of the first object. For example, the tuning component may be configured to receive the signal impedance characteristics data, the object identifier, and/or the location data and to determine how the capacitive field should be tuned to allow for detection of touches on the object. For example, when the signal impedance characteristics data indicates gain settings, signal amplitude settings, signal frequency settings, an amount of charge to apply, or other settings associated with the capacitive sensor, the tuning component may cause those settings to be applied to the capacitive sensor for an area of the touch-sensitive surface corresponding to the area where the object is disposed. In other examples, when the signal impedance characteristics data indicates the thickness of the object and/or the material of the object, the tuning component may determine the capacitive sensor settings to be applied based at least in part on the signal impedance characteristics data. Determining the capacitive sensor settings may be performed by analyzing the features of the object in association with known settings associated with those features. Determining the capacitive sensor settings may also be performed utilizing one or more modeling techniques, such as machine learning models, as will be described in more detail below. The tuning component may be configured to apply the settings as described herein to certain electrodes of the capacitive mesh. For example, each electrode row and electrode column may be given an identifier, and the rows and columns that are associated with the area and location of the object may be tuned based at least in part on the settings such that the capacitive field extends from the touch-sensitive surface to the surface of the object. It should be understood that the surface of the object that may receive touch input from the user and/or another object may be described herein as the opposing surface from the touch-sensitive surface of the device. As such, a surface of the object that is proximal to the touch-sensitive surface of the device may include the one or more fiducials, while a distal surface of the object may be the opposing surface and/or opposing side of the object relative to the proximal surface.

Additionally, or alternatively, the process 700 may include receiving second input data at the location of the first object, the second input data corresponding to a user pressing on the first object. The process 700 may also include determining that the second input data is received while the first fiducials are in contact with the touch-sensitive surface. The process 700 may also include selecting a first action to be performed responsive to the second input data, the first action selected in response to the second input data being received at the location and while the first fiducials are in contact with the touch-sensitive surface, the first action differing from a second action associated with received touch input at the location absent the object being placed on the touch-sensitive surface.

Additionally, or alternatively, the process 700 may include determining, from the first impedance characteristics, a signal pulse frequency to apply to the capacitive touch sensor at the location. The process 700 may also include determining, from the first impedance characteristics, a signal voltage to apply to the capacitive touch sensor at the location. In these examples, causing the capacitive touch sensor to be tuned may include applying the signal pulse frequency and the signal voltage to the location of the capacitive touch sensor.

Additionally, or alternatively, the process 700 may include receiving second input data at the location of the first object and determining that the second input data corresponds to second fiducials of a second object contacting the first object. The process 700 may also include determining second impedance characteristics associated with the second object. The process 700 may also include causing the capacitive touch sensor to be tuned, utilizing the second impedance characteristics, such that the capacitive field associated with the touch-sensitive surface extends from the opposing side of the first object through at least a portion of the second object.

FIG. 8 illustrates a flow diagram of another example process 800 for capacitive field tuning for detecting touches on objects. The order in which the operations or steps are described is not intended to be construed as a limitation, and any number of the described operations may be combined in any order and/or in parallel to implement process 800.

At block 802, the process 800 may include receiving, from one or more capacitive touch sensors, first input data indicating that a first object has been placed on a surface of a device. For example, one or more layers of a conductive mesh may be disposed in the device along with one or more layers between the conductive mesh and the touch-sensitive surface. Those one or more layers may include various dielectrics, adhesives, conductive coatings, acrylic and/or glass layers, plastic layers, and the touch-sensitive surface itself. To determine when a user and/or object touches the touch-sensitive surface without detecting a touch prior to the user and/or object making contact with the surface, the capacitive field generated by the capacitive sensors may be tuned in one or more ways. For example, generally, an electric signal is sent through the conductive mesh and multiple signal receivers capture the signal after it runs through the conductive mesh. When no user and/or object is touching the surface, the electric signals are received at a certain strength. However, when a user and/or other conductive object enters the conductive field associated with the capacitive sensors, the mutual coupling between electrodes in a given row and column of the conductive mesh is altered. The alteration in mutual coupling may be measured by the capacitive sensor to determine when an object contacts, or nearly contacts, the surface and thus when to indicate that a touch has occurred. Given that the conductive mesh includes multiple electrode rows and columns, the mutual coupling alteration at given rows and columns and/or between rows and columns may allow for the determination of a location of the touch in question. Generally, various aspects of the capacitive sensor are tuned to allow for accurate detection of touch on the surface. Those aspects include an amplitude of the electrical signal applied to the electrodes, a frequency of the electrical signal applied to the electrodes, a gain setting associated with receiving the electrical signal at the receivers, an amount of charge applied to the electrodes, and/or thresholds associated with determining when a mutual coupling alteration is interpreted as a touch or not. The tuning of these aspects may be based at least in part on a distance between the touch-sensitive surface and the conductive mesh as well as signal impedance characteristics of the touch-sensitive surface and/or the layers of material between the surface and the conductive mesh.

At block 804, the process 800 may include determining that the first input data corresponds to first fiducials contacting the surface. For example, the first input data may indicate that multiple touch inputs are received at the same time on the touch-sensitive surface, as well as information about those touch inputs, such as a number of inputs, spacing between inputs, input shapes, etc. This information may be utilized to determine that the touch input corresponds to first fiducials contacting the surface, as opposed to a user touching the surface and/or another object such as a stylus touching the surface.

At block 806, the process 800 may include determining, based at least in part on the first fiducials, first characteristics of the first object, the first characteristics indicating signal impedance caused by the first object from the surface to an opposing side of the first object. For example, an object identification component of the device and/or a system associated with the device may utilize the characteristics of the touch input corresponding to the fiducials to identify the object and/or an object type of the object. For example, a first object may have eight fiducials that are arranged in two rectangular patterns. Four of the fiducials of the first object may be larger than the other four fiducials of the first object. These characteristics may be utilized by the object identification component of the device and/or the system to identify the first object.

At block 808, the process 800 may include determining a location of the first object on the surface. For example, a given object identifier may indicate that the corresponding object is a rectangle or a circle and that the object has certain dimensions, such as a rectangle having a length of approximately 5 centimeters and a width of approximately 2 centimeters, and/or a circle having a radius of 4 centimeters. The location component may utilize this information to determine which portion of the touch-sensitive surface corresponds to where the object is located. The location component may also be utilized to determine when the location of the object changes, such as when the object is moved on the touch-sensitive surface.

At block 810, the process 800 may include causing, based at least in part on the first characteristics, a sensitivity of one or more capacitive touch sensors associated with the location to be tuned such that when a touch input is received on the opposing side of the first object the touch input is detected by the one or more capacitive touch sensors. For example, the tuning component may be configured to receive the signal impedance characteristics data, the object identifier, and/or the location data and to determine how the capacitive field should be tuned to allow for detection of touches on the object. For example, when the signal impedance characteristics data indicates gain settings, signal amplitude settings, signal frequency settings, an amount of charge to apply, or other settings associated with the capacitive sensor, the tuning component may cause those settings to be applied to the capacitive sensor for an area of the touch-sensitive surface corresponding to the area where the object is disposed. In other examples, when the signal impedance characteristics data indicates the thickness of the object and/or the material of the object, the tuning component may determine the capacitive sensor settings to be applied based at least in part on the signal impedance characteristics data. Determining the capacitive sensor settings may be performed by analyzing the features of the object in association with known settings associated with those features. Determining the capacitive sensor settings may also be performed utilizing one or more modeling techniques, such as machine learning models, as will be described in more detail below. The tuning component may be configured to apply the settings as described herein to certain electrodes of the capacitive mesh. For example, each electrode row and electrode column may be given an identifier, and the rows and columns that are associated with the area and location of the object may be tuned based at least in part on the settings such that the capacitive field extends from the touch-sensitive surface to the surface of the object. It should be understood that the surface of the object that may receive touch input from the user and/or another object may be described herein as the opposing surface from the touch-sensitive surface of the device. As such, a surface of the object that is proximal to the touch-sensitive surface of the device may include the one or more fiducials, while a distal surface of the object may be the opposing surface and/or opposing side of the object relative to the proximal surface.

Additionally, or alternatively, the process 800 may include receiving second input data at the location of the first object. The process 800 may also include determining that the second input data is received while the first fiducials are in contact with the surface. The process 800 may also include selecting a first action to be performed based at least in part on the second input data being received at the location and while the first fiducials are in contact with the surface.

Additionally, or alternatively, the process 800 may include determining, based at least in part on the first characteristics, a gain threshold to apply to the capacitive touch sensor at the location. In these examples, causing the capacitive touch sensor to be tuned may be based at least in part on the gain threshold.

Additionally, or alternatively, the process 800 may include receiving second input data at the location of the first object. The process 800 may also include determining that the second input data corresponds to fiducials of a second object contacting the first object based at least in part on the second input data indicating multiple touches on the first object in a predefined arrangement. The process 800 may also include determining second characteristics associated with the second object. The process 800 may also include causing the capacitive touch sensor to be tuned such that the capacitive field extends from the opposing side of the first object through at least a portion of the second object.

Additionally, or alternatively, the process 800 may include determining an object identifier of the first object based at least in part on the first fiducials. The process 800 may also include determining an object type of the first object utilizing the object identifier. The process 800 may also include determining impedance characteristics associated with the object type. In these examples, determining the first characteristics of the first object may be based at least in part on the impedance characteristics of the object type.

Additionally, or alternatively, the process 800 may include determining, based at least in part on the first characteristics, a signal pulse frequency to apply to the capacitive touch sensor at the location. In these examples, causing the capacitive touch sensor to be tuned may be based at least in part on the signal pulse frequency.

Additionally, or alternatively, the process 800 may include determining, based at least in part on the first characteristics, a signal voltage to apply to the capacitive touch sensor at the location. In these examples, causing the capacitive touch sensor to be tuned may be based at least in part on the signal voltage.

Additionally, or alternatively, the process 800 may include causing, based at least in part on the first input data corresponding to the first fiducials, output of a request for a user to press the first object. The process 800 may also include causing, prior to receiving second input data representing the user pressing the first object, modulation of the capacitive field. The process 800 may also include determining, from the modulation of the capacitive field, a gain value that indicates the second input data is being received on the second object. The process 800 may also include selecting a gain setting to apply to the capacitive touch sensor at the location based at least in part on the gain value.

Figure 9:
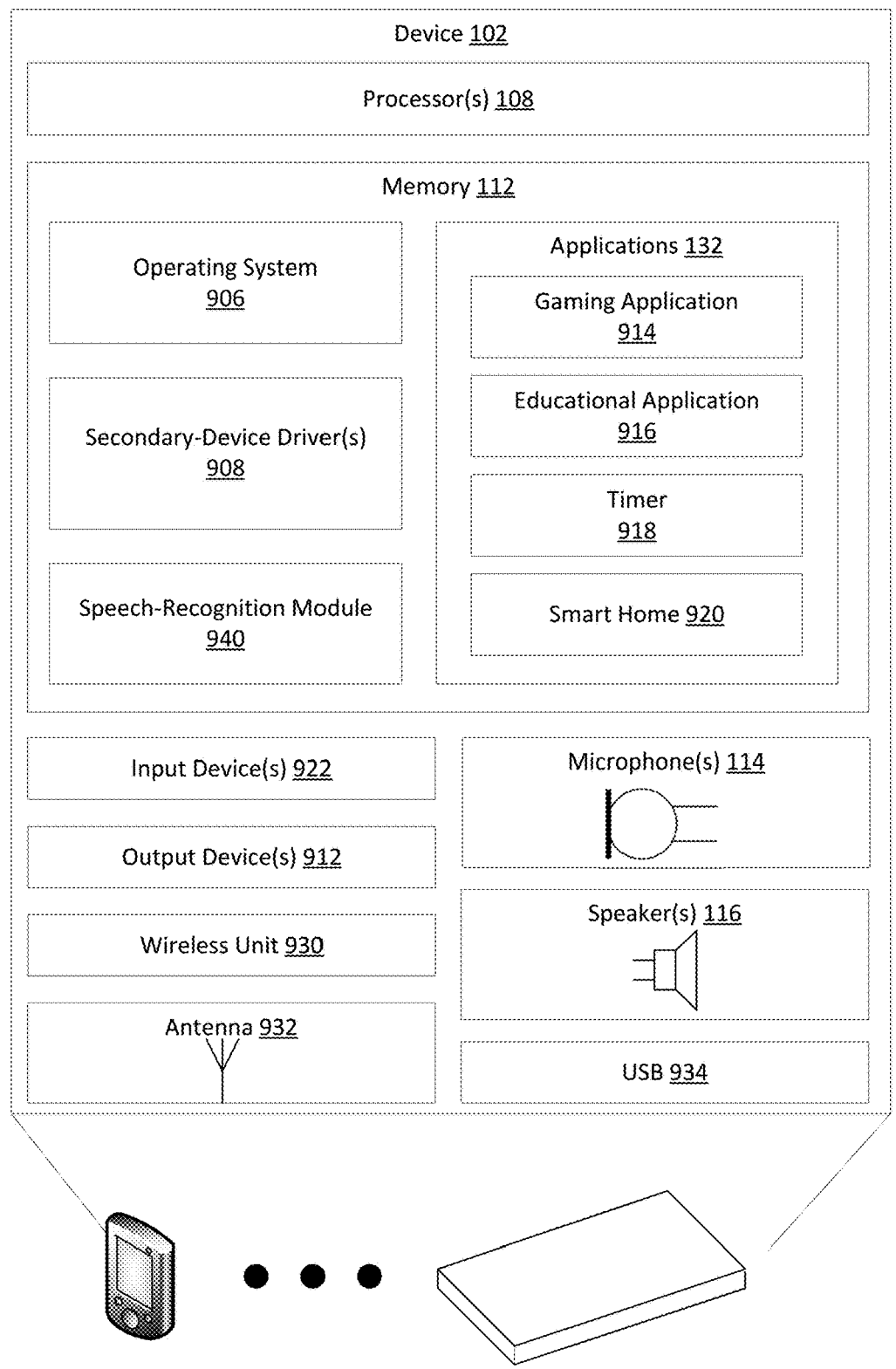
FIG. 9 illustrates a conceptual diagram of components of an example device on which capacitive field tuning may be performed.

FIG. 9 illustrates a conceptual diagram of components of an example device on which capacitive field tuning for detecting touches on objects may be performed. The device 102 may be implemented as a standalone device that is relatively simple in terms of functional capabilities with limited input/output components, memory, and processing capabilities. For instance, the device 102 may not have a display (other than simple lights, for instance). The device 102 may be implemented with the ability to receive and output audio, a network interface (wireless or wire-based), power, and processing/memory capabilities. In certain implementations, a set of one or more input components may be employed (e.g., a dedicated button to initiate a configuration, power on/off, etc.). Nonetheless, a mode of user interaction with the device 102 may be through voice input and audible output.

The device 102 may also be implemented in other form factors, such as a mobile device (e.g., a smart phone or personal digital assistant). The mobile device may include a touch-sensitive display screen and various buttons for providing input as well as additional functionality such as the ability to send and receive telephone calls. Alternative implementations of the device 102 may also include configuration as a personal computer, a rubber mat or a mat made of another material, etc. The personal computer may include a keyboard, a mouse, a display screen, and any other hardware or functionality that is typically found on a desktop, notebook, netbook, or other personal computing devices. These devices, however, are merely examples and not intended to be limiting, as the techniques described in this disclosure may be used in essentially any device that has an ability to recognize speech input or other types of natural language input and to receive touch input on a touch-sensitive surface.

In the illustrated implementation, the device 102 includes one or more processors 108 and memory 112. In some implementations, the processors(s) 108 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 may possess its own local memory, which also may store program modules, program data, and/or one or more operating systems. The memory 112 may include components described with respect to FIG. 1.

Several modules such as instruction, datastores, and so forth may be stored within the memory 112 and configured to execute on the processor(s) 108. A few example functional modules are shown as applications stored in the memory 112 and executed on the processor(s) 108, although the same functionality may alternatively be implemented in hardware, firmware, or as a system on a chip (SOC). At least some of the components shown in FIG. 1 may also be stored in the memory 112 and executable by the processor(s) 108 to implement the functionality described herein.

An operating system component 906 may be configured to manage hardware within and coupled to the device 102 for the benefit of other components. In addition, in some instances the device 102 may include some or all of one or more secondary-device drivers 908. In other instances, meanwhile, the device 102 may be free from the drivers 908 for interacting with second devices. The device 102 may further including, in some instances, a speech-recognition module 940, which may correspond to the on-device speech processing described with reference to FIG. 1.

The device 102 may also include a plurality of applications 132 stored in the memory 112 or otherwise accessible to the device 102. In this implementation, the applications 132 are a gaming application 914, an educational application 916, a timer 918, and a smart home application 920. However, the device 102 may include any number or type of applications and is not limited to the specific examples shown here. The gaming application 914 may be configured to initiate and play one or more games utilizing the device 102. The educational application 916 may be configured to initiate and run one or more educational programs. The timer 918 may be configured to provide the functions of a simple timing device and clock. The smart home application 920 may be configured to assist in controlling smart devices. When implementing "hybrid" functionality where a system 104 is unavailable to the device 102 and/or when the device 102 is configured to respond to intents without aid from the system 104, these applications 132 may be configured to access on-device resources (e.g., on-device game and application libraries, an on-device shopping list, an on-device calendar, etc.). In some cases, changes made to these on-device resources may be synched with off-device versions of those resources when the system 104 subsequently becomes available to the device 102.

Generally, the device 102 has input devices 922 and output devices 912. The input devices 922 may include, without limitation, a keyboard, keypad, mouse, touch screen, joystick, control buttons, etc. In some implementations, one or more microphones 114, which may be similar to the microphone(s) 114 of FIG. 1 and may function as input devices 922 to receive audio input, such as user voice input. The output device(s) 912 may be similar to the output device(s) of FIG. 1, and may include, without limitation, a display(s), a light element (e.g., LED), a vibrator to create haptic sensations, or the like. In some implementations, one or more speakers 116 may function as output devices 912 to output audio sounds (e.g., audio content, TTS responses, tones at various frequencies, etc.).

A user may interact with the device 102 by speaking to it, and the one or more microphone(s) 114 captures the user's speech. The device 102 can communicate back to the user by emitting audible statements through the speaker 116. In this manner, the user can interact with the device 102 solely through speech, without use of a keyboard or display.

The device 102 may further include a wireless unit 930 coupled to an antenna 932 to facilitate a wireless connection to a network. The wireless unit 930 may implement one or more of various wireless and/or IoT technologies, such as Bluetooth® protocol, Bluetooth Low Energy (BLE) protocol, ZigBee® protocol, Z-wave® protocol, WiFi protocol, and/or any other type of protocol usable to communicate wirelessly between electronic devices in an environment, including those that do and/or do not rely data transmission over the wide area network 108. As such, the device 102 may be configured to act as a hub that can communicate with second devices in the environment and control the second devices, such as by using protocol stacks, drivers, and adapters to communicate over a suitable communications protocol. A USB port 934 may further be provided as part of the device 102 to facilitate a wired connection to a network, or a plug-in network device that communicates with other wireless networks. In addition to the USB port 934, or as an alternative thereto, other forms of wired connections may be employed, such as a broadband connection, Transmission Control Protocol/Internet Protocol (TCP/IP) protocol connection, etc.

Figure 10:
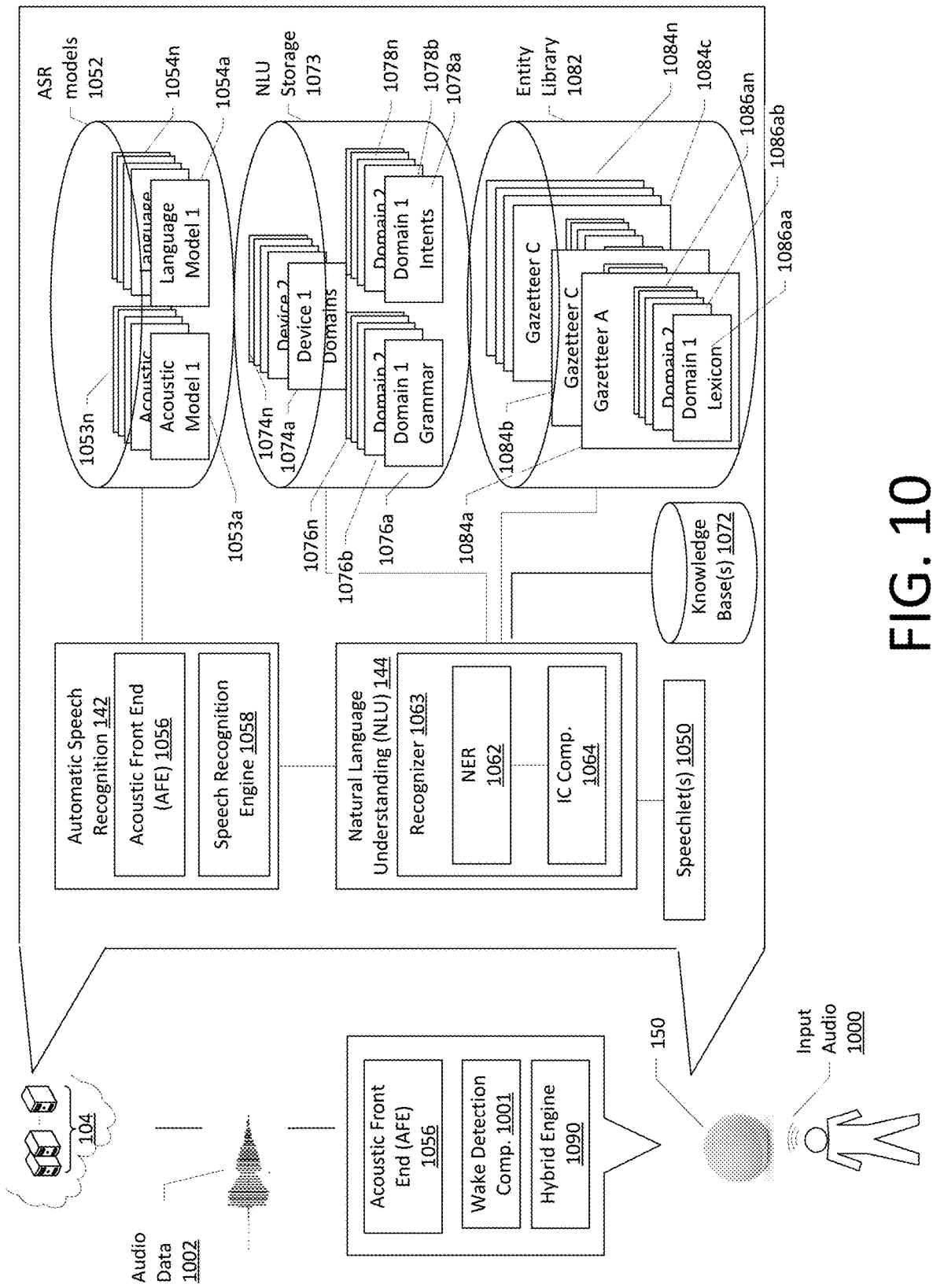
FIG. 10 illustrates a conceptual diagram of components of a speech-processing system for processing audio data provided by one or more devices, including for tuning capacitive fields of touch-sensitive surfaces.

FIG. 10 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 10 may occur directly or across a network 106. An audio capture component, such as a microphone 114 of the device 102, or another device, captures audio 1000 corresponding to a spoken utterance. The device 102, using a wake word engine 1001, then processes audio data corresponding to the audio 1000 to determine if a keyword (such as a wakeword) is detected in the audio data. Following detection of a wakeword, the device 102 processes audio data 1002 corresponding to the utterance utilizing an ASR component 142. The audio data 1002 may be output from an optional acoustic front end (AFE) 1056 located on the device prior to transmission. In other instances, the audio data 1002 may be in a different form for processing by a remote AFE 1056, such as the AFE 1056 located with the ASR component 142.

The wake word engine 1001 works in conjunction with other components of the user device, for example a microphone to detect keywords in audio 1000. For example, the device may convert audio 1000 into audio data, and process the audio data with the wake word engine 1001 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 1001 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 1001 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the device 102 may "wake." The audio data 1002 may include data corresponding to the wakeword. Further, a device may "wake" upon detection of speech/spoken audio above a threshold, as described herein. An ASR component 142 may convert the audio data 1002 into text. The ASR transcribes audio data into text data representing the words of the speech contained in the audio data 1002. The text data may then be used by other components for various purposes, such as executing system commands, inputting data, etc. A spoken utterance in the audio data is input to a processor configured to perform ASR which then interprets the utterance based on the similarity between the utterance and pre-established language models 1054 stored in an ASR model knowledge base (ASR Models Storage 1052). For example, the ASR process may compare the input audio data with models for sounds (e.g., subword units or phonemes) and sequences of sounds to identify words that match the sequence of sounds spoken in the utterance of the audio data. As described in more detail herein, the device 102 may include a hybrid engine 1090, which may perform some or all of the speech processing described herein and/or may arbitrate between speech processing results determined on the device 102 and those received from other devices and/or the system 104. In these examples, at least a portion of the speech processing described with respect to the system 104 may be performed by the device 102.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1053 stored in an ASR Models Storage 1052), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 142 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1056 and a speech recognition engine 1058. The acoustic front end (AFE) 1056 transforms the audio data from the microphone into data for processing by the speech recognition engine 1058. The speech recognition engine 1058 compares the speech recognition data with acoustic models 1053, language models 1054, and other data models and information for recognizing the speech conveyed in the audio data. The AFE 1056 may reduce noise in the audio data and divide the digitized audio data into frames representing time intervals for which the AFE 1056 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1058 may process the output from the AFE 1056 with reference to information stored in speech/model storage (1052). Alternatively, post front-end processed data (such as feature vectors) may be received by the device executing ASR processing from another source besides the internal AFE. For example, the user device may process audio data into feature vectors (for example using an on-device AFE 1056).

The speech recognition engine 1058 attempts to match received feature vectors to language phonemes and words as known in the stored acoustic models 1053 and language models 1054. The speech recognition engine 1058 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, play Game A?" The wake detection component may identify the wake word, otherwise described as a trigger expression, "Alexa," in the user utterance and may "wake" based on identifying the wake word. The speech recognition engine 1058 may identify, determine, and/or generate text data corresponding to the user utterance, here "play Game A."

The speech recognition engine 1058 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1058 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 144 may include various components, including potentially dedicated processor(s), memory, storage, etc. As shown in FIG. 10, an NLU component 144 may include a recognizer 1063 that includes a named entity recognition (NER) component 1062 which is used to identify portions of query text that correspond to a named entity that may be recognizable by the system. A downstream process called named entity resolution links a text portion to a specific entity known to the system. To perform named entity resolution, the system may utilize gazetteer information (1084a-1084n) stored in entity library storage 1082. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 142 based on the utterance input audio 1000) and attempts to make a semantic interpretation of the text. That is, the NLU process determines the meaning behind the text based on the individual words and then implements that meaning. NLU processing 144 interprets a text string to derive an intent or a desired action from the user as well as the pertinent pieces of information in the text that allow a device (e.g., device 102) to complete that action. For example, if a spoken utterance is processed using ASR 142 and outputs the text "play Game A" the NLU process may determine that the user intended to initiate a gaming application, with the gaming application being Game A.

The NLU 144 may process several textual inputs related to the same utterance. For example, if the ASR 142 outputs N text segments (as part of an N-best list), the NLU may process all N outputs to obtain NLU results.

As will be discussed further below, the NLU process may be configured to parse and tag to annotate text as part of NLU processing. For example, for the text "play Game A," "play" may be tagged as a command (to initiate a gaming application) and "Game A" may be tagged as the naming identifier of the gaming application to be initiated.

To correctly perform NLU processing of speech input, an NLU process 144 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1062 receives a query in the form of ASR results and attempts to identify relevant grammars and lexical information that may be used to construe meaning. To do so, the NLU component 144 may begin by identifying potential domains that may relate to the received query. The NLU storage 1073 includes a database of devices (1074a-1074n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 1063, language model and/or grammar database (1076a-1076n), a particular set of intents/actions (1078a-1078n), and a particular personalized lexicon (1086). Each gazetteer (1084a-1084n) may include domain-indexed lexical information associated with a particular user and/or device. For example, the Gazetteer A (1084a) includes domain-index lexical information 1086aa to 1086an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1064 parses the query to determine an intent or intents for each identified domain, where the intent corresponds to the action to be performed that is responsive to the query. Each domain is associated with a database (1078a-1078n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 1064 identifies potential intents for each identified domain by comparing words in the query to the words and phrases in the intents database 1078. In some instances, the determination of an intent by the IC component 1064 is performed using a set of rules or templates that are processed against the incoming text to identify a matching intent.

In order to generate a particular interpreted response, the NER 1062 applies the grammar models and lexical information associated with the respective domain to actually recognize a mention of one or more entities in the text of the query. In this manner, the NER 1062 identifies "slots" or values (i.e., particular words in query text) that may be needed for later command processing. Depending on the complexity of the NER 1062, it may also label each slot with a type of varying levels of specificity (such as noun, place, device name, device location, city, artist name, song name, amount of time, timer number, or the like). Each grammar model 1076 includes the names of entities (i.e., nouns) commonly found in speech about the particular domain (i.e., generic terms), whereas the lexical information 1086 from the gazetteer 1084 is personalized to the user(s) and/or the device. For instance, a grammar model associated with the shopping domain may include a database of words commonly used when people discuss shopping.

The intents identified by the IC component 1064 are linked to domain-specific grammar frameworks (included in 1076) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (1076) framework or frameworks may correspond to sentence structures such as "purchase item called 'Item A' from Marketplace A."

For example, the NER component 1062 may parse the query to identify words as subject, object, verb, preposition, etc., based on grammar rules and/or models, prior to recognizing named entities. The identified verb may be used by the IC component 1064 to identify intent, which is then used by the NER component 1062 to identify frameworks. A framework for the intent of "play a song," meanwhile, may specify a list of slots/fields applicable to play the identified "song" and any object modifier (e.g., specifying a music collection from which the song should be accessed) or the like. The NER component 1062 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1062 may search the database of generic words associated with the domain (in the knowledge base 1072). So, for instance, if the query was "identify this song," after failing to determine which song is currently being output, the NER component 1062 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 1050. The speechlet 1050 may be determined based on the NLU output. For example, if the NLU output includes a command to send a message, the speechlet 1050 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the speechlet 1050 may provide some or all of this information to a text-to-speech (TTS) engine. The TTS engine may then generate an actual audio file for outputting the audio data determined by the application (e.g., "okay," or "Game A started").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 144 during runtime operations where NLU operations are performed on text (such as text output from an ASR component 142). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1063. Each recognizer may include various NLU components such as an NER component 1062, IC component 1064 and other components such as an entity resolver, or other components.

For example, a messaging domain recognizer 1063-A (Domain A) may have an NER component 1062-A that identifies what slots (i.e., portions of input text) may correspond to particular words relevant to that domain. The words may correspond to entities such as (for the messaging domain) a recipient. An NER component 1062 may use a machine learning model, such as a domain specific conditional random field (CRF) to both identify the portions corresponding to an entity as well as identify what type of entity corresponds to the text portion. The messaging domain recognizer 1063-A may also have its own intent classification (IC) component 1064-A that determines the intent of the text assuming that the text is within the proscribed domain. An IC component may use a model, such as a domain specific maximum entropy classifier to identify the intent of the text, where the intent is the action the user desires the system to perform. For this purpose, device 102 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system 104, as illustrated herein are exemplary, and may be located in a stand-alone device or may be included, in whole or in part, as a component of a larger device or system, may be distributed across a network or multiple devices connected by a network, etc.

Figure 11:
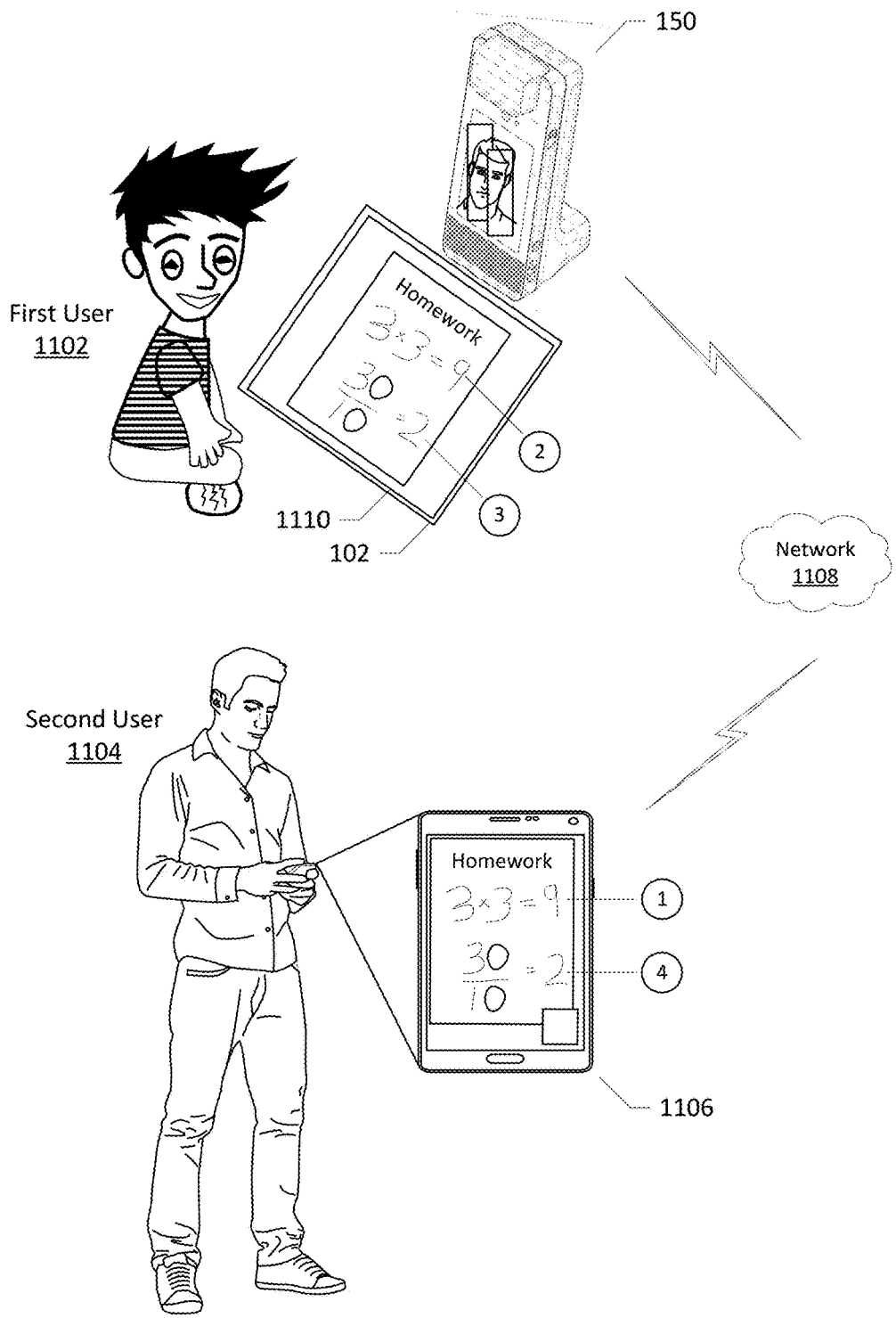
FIG. 11 illustrates an example environment for utilizing a projecting device to interact with a remote device, according to an embodiment of the present disclosure.

FIG. 11 illustrates an example environment for using the electronic device 150 to interact among users. For example, a first user 1102 is shown interacting with the electronic device 150 to communicate with a second user 1104, who interacts with a remote device 1106. Although the remote device 1106 is illustrated as a mobile device, such as a phone, the remote device 1106 may include a tablet, laptop, another electronic device, and so forth. The first user 1102 may be located in a first location and the second user 1104 may be located in a second location that is remote from the first location. The electronic device 150 and the remote device 1106 are shown being in communication via a network 1108, such as the Internet. In doing so, the electronic device 150 may send and receive information to and from the remote device 1106, enabling interactivity between the first user 1102 and the second user 1104.

The electronic device 150 and the remote device 1106 may to provide an immersive and interactive experience for the first user 1102 and the second user 1104. For example, the electronic device 150 is shown including a shared space 1110 through which the first user 1102 and the second user 1104 may interact. As illustrated, the first user 1102 may place a piece of homework within the shared space 1110. A camera of the electronic device 150 may capture images and generate image data corresponding to the piece of homework. The camera may be oriented downward, towards a bottom of the electronic device 150, or towards the device 102, for observing content within the shared space 1110. The electronic device 150 may then transmit the image data to the remote device 1106 for output. For example, as illustrated, the piece of homework may be output on a display (e.g., screen) of the remote device 1106.

The electronic device 100 may further include microphones for capturing speech of the first user 1102 and loudspeakers for outputting audio associated with the second user 1104.

The electronic device 150 may further include a camera for capturing images and generating image data of the first user 1102. The camera may be oriented towards a front of the electronic device 150 for capturing images of the first user 1102. This image data may then be transmitted to the remote device 1106 for output. For example, the remote device 1106, in addition to displaying the piece of homework, may include a portion for outputting the image of the first user 1102. Likewise, the electronic device 150 may output image data depicting the second user 1104 on the display. Presenting image data of the second user 1104 may increase the immersive experience between the first user 1102 and the second user 1104.

To sense interactions within the shared space 1110, the electronic device 150 may include an emitter and a sensor. The emitter may broadcast a plane of light across the shared space 1110 for sensing inputs of the first user 1102. The sensor may detect the touch or interactions through the scattering of IR light as the first user 1102 breaks, or crosses, the plane of light. That is, as the first user 1102 works on the piece of homework, the location of the input may be sensed by the sensor detecting the scattering of light. In turn, the electronic device 150 may transmit data to the remote device 1106. Additionally, the use of capacitive sensing, and particularly the detection of touch on objects placed in the shared space 1110 may be performed as described herein.

The second user 1104 may monitor the progress of the first user 1102 at the remote device 1106. That is, the second user 1104 may interact with the first user 1102 by interacting with the remote device 1106 and such interactions may be presented by the electronic device 150, within the shared space 1110. For example, at "1" the second user 1104 may assist the first user 1102 in solving the math problem "3×3" by entering "9." This input (e.g., touch input) may be sensed by the remote device 1106 and transmitted to the electronic device 150 for output. For example, at "2" the electronic device 150 may display the answer "9" on the piece of homework to indicate the action by the second user 1104. The electronic device 150 may present the answer "9" by projecting content via a projector. As part of this interaction the first user 1102 and the second user 1104 may engage in other forms of interaction, such as speech and video.

Similarly, the first user 1102 may interact within the shared space 1110, attempting to solve the math problem "30/10." For example, at "3" the first user 1102 may enter answer of "2." In some instances, the first user 1102 may provide the answer "2" using a pencil, for example, by drawing on the piece of homework, and/or may provide touch input to the device 102. The camera may capture this input by first user 1102 and transmit associated image data to the remote device 1106. Moreover, the sensor of the electronic device 150 may determine a location associated with the touch input through detecting scattering light emitted by the emitter. The electronic device 150 may capture motions associated with the first user 1102 within the shared space 1110 for transmitting to the remote device 1106. Capacitive touch sensing, including on objects, may also be performed to detect touches and determine touch locations. In turn, at "4" the remote device 1106 may display the answer as answered by the first user 1102. However, given that the answer "2" is incorrect, the second user 1104 may interact with the first user 1102 for correcting the mistake. For example, the second user 1104 may provide assistance by drawing on the remote device 1106, verbally explaining the correct answer, and so forth.

In some instances, the electronic device 150 may be used along with a device 102 that is placed on a surface on which the electronic device 150 resides. For example, certain surfaces may be difficult to project image(s) onto (e.g., uneven surfaces, wood grain, etc.). In these instances, content presented by the projector may become skewed or distorted. The device 102 may provide an even surface for projecting content. In some instances, the device 102 may be sized according to the shared space 1110, or may be sized slightly larger than the shared space 1110. For example, the device 102 may include a width between approximately 15 inches and 25 inches (X-direction), and a length between approximately 10 inches and 15 inches. In some instances, the device 102 may include materials with reflective surface(s) to reflect light diffusely. In these instances, the material of the device 102 may reflect incident light at many angles (i.e., diffuse reflection), rather than at just one angle (i.e., specular reflection). This may increase a viewing experience of users interacting with the electronic device 150 and the device 102. For example, diffuse reflection may allow users to view a bright, vivid image of content projected by the projector. Comparatively, materials or finishes with specular reflection may result in perceived glares by the user.

The material of the device 102 may include, but is not limited to, polymers, foams, rubber, composites, etc. Additionally, materials may be surface treated to be reflective and/or with certain colors to display projected content (e.g., white). For example, a surface of the device 102 may include a low coefficient of friction for reducing drag, stickiness, or pull during swiping actions by the first user 1102. The device 102 may be compact and/or easily stored when not in use (e.g., folded, rolled, etc.). The device 102 may also include indents, cutouts, or other features for aligning the device 102 with the electronic device 150.

Accordingly, FIG. 11 illustrates a scenario in which the electronic device 150 and the remote device 1106 may mirror inputs provided by the first user 1102 and the second user 1104, respectively, to facilitate interactions between remote locations.

Figure 12:
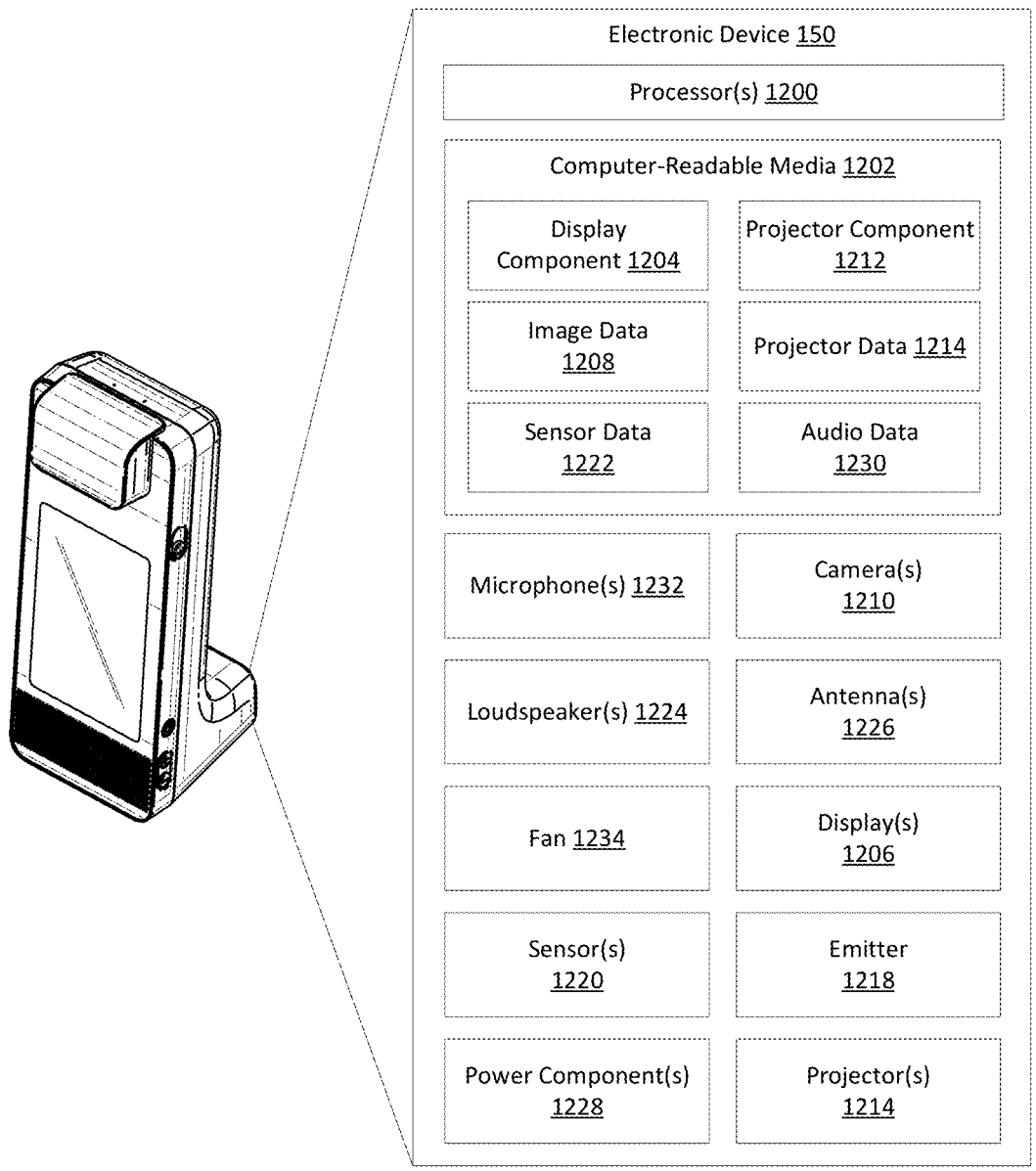
FIG. 12 illustrates example computing components of a projecting device according to an embodiment of the present disclosure.

FIG. 12 illustrates example computing components of the electronic device 150. The electronic device 150 may include one or more processor(s) 1200 and computer-readable media 1202. Several components such as instructions, data stores, and so forth can be stored within the computer-readable media 12802 and be configured to execute on the processor(s) 1200. A few example functional components are shown as applications stored in the computer-readable media 1202 and executed on the processor(s) 1200, although the same functionality can alternatively be implemented in hardware, firmware, or as a system on a chip (SOC).

A display component 1204 is configured to control one or more display(s) 1206 of the electronic device 150. For example, the electronic device 150 may receive image data 1208 representing image(s) and/or video(s) received from remote device(s) (e.g., tablet, mobile phone, laptop, etc.). The display component 1204 may cause the display(s) 1206 to output the image data 1208 on the display, for viewing by user(s) of the electronic device 150. In some instances, the display(s) 1206 may include high-resolution displays, e-ink displays, tactile electronic displays (e.g., refreshable Braille displays), segment displays, LED displays, LCDs, laser displays, holographic displays, and the like. Additionally, the display(s) 1206 may be touch-sensitive and capable of receiving touch input from the user(s). For example, the display(s) 1206 may include one or more touch screens and/or capacitive sensing.

The image data 1208 may also correspond to image(s) and/or video(s) captured by camera(s) 1210 of the electronic device 150. For example, the electronic device 150 may include a first camera for capturing image(s) and/or video(s) of the user(s) of the electronic device 150. Image(s) and/or video(s) captured by the first camera may be transmitted to the remote device(s) to provide an immersive experience between user(s) of the electronic device 150 and user(s) of remote device(s). Additionally, the electronic device 150 may include a second camera for capturing content presented by the user(s) of the electronic device 150 within a shared space. The shared space may represent an area in front of the electronic device 150 whereby the user(s) may provide content or materials (e.g., homework, drawing, book, etc.) for interacting with the user(s) of the remote device(s). Within this shared space, the second camera may capture content presented or shared by the user(s) of the electronic device 150. By way of example, if the user(s) present a piece of homework, the second camera may capture image data 1208 associated with the homework and transmit the image data 1208 to the remote device(s) for viewing. In some instances, the camera(s) 1210 may include a high-resolution camera, a depth sensor, IR sensor, RGB camera, and/or other imagining devices and/or sensors.

A projector component 1212 is configured to control one or more projectors 1214 of the electronic device 150. For example, the electronic device 150 may receive projector data 1216 representing content received from remote device(s). The content may correspond to interactions made by user(s) of the remote device(s). For example, the user(s) of the remote device(s) may interact with first user(s) of the electronic device 150. By way of illustration, if the user(s) of the electronic device 150 and the user(s) of the remote device are working on homework, the user(s) of the remote device may provide interactions associated with solving a math problem. The remote device(s) may capture these interactions, and the projector component 1212 may output content associated with these interactions (i.e., the projector data 1216). Moreover, this projected content may be overlaid or presented on top of material (e.g., homework) within the shared space. As such, the projector component 1212 may receive projector data 1216 for being projected by the projector.

To sense interactions made by the user(s) of the electronic device 150, the electronic device 150 may include an emitter 1218 and sensor(s) 1220. The emitter 1218 may output a plane of light in front of the electronic device 150, within the shared space. The plane of light is invisible to the user(s) and may run parallel to a surface on which the electronic device 150 resides. As the user(s) interacts within the shared space, the sensor(s) 1220 may detect scattering of the light to determine a position of the interaction. These inputs are captured by the sensor(s) 1220, which generate sensor data 1222. In some instances, the sensor data 1222 may indicate a location of the inputs within the spared space for use in portraying the touch inputs to the user(s) of the remote device(s). For example, continuing with the above example, if the user(s) of the electronic device 150 point to a particular math problem, the sensor(s) 1220 may detect the reflected light for determining a position of the interaction. The electronic device 150 may then transmit these interactions, as well as the images and/or video captured by the camera(s) 1210, to the remote device(s) for output.

The electronic device 150 is further shown including one or more microphone(s) 1232, one or more speaker(s) 1224, one or more antenna(s) 1226, and/or one or more power components 1228. In some implementations, the one or more microphone(s) 1232 may function as input devices to receive audio input, such as user voice input. For example, the user(s) of the electronic device 150 may interact with the user(s) of the remote device through speech, and the one or more microphone(s) 1232 capture the speech. The electronic device 150 may output speech of the user(s) of the remote device (i.e., audio) to the user(s) of the electronic device 150 through the one or more speaker(s) 1224. For example, the electronic device 150 may receive audio data 1230 from the remote device(s) for outputting audio via the speaker(s) 1224. Additionally, the audio data 1230 may represent audio of the user(s) of the electronic device 150 captured by the one or more microphone(s) 1232.

In some instances, the one or more antenna(s) 1226 are configured to send and/or receive wireless signals for communicating with other devices, such as the remote device(s). In some instances, the one or more antenna(s) 1226 may operate in conjunction with one or more wireless units to implement one or more of various wireless technologies, such as Wi-Fi, Bluetooth, RF, cellular, satellite, NFC (near-field communication), RFID (radio frequency identification), and so on. In some instances, the one or more antenna(s) 1226 may be used to communicate wirelessly with one or more remote device(s) via a network such as the internet. In some instances, the electronic device 150 may communicate in a mesh network (e.g., directly between remote device(s)) and/or via an access point.

In some instances, the one or more power components 1228 provide electrical power to the electronic device 150. In some instances, the power components 1228 may include one or more batteries, capacitors, inductors, chargers, ports, etc. to receive and store power. In some instances, the power components 1228 may include contact charging or inductive charging systems to receive power from a variety of mechanisms. In some instances, the one or more power components 1228 may include a port to receive mains power.

A fan 1234 is further included to dissipate head generated by components of the electronic device 150. The fan 1234, for example, may operate to intake air, circulate air within an interior of the electronic device 150, and vent the heated air out of the electronic device 150.

The electronic device 150 may further include, in some instances, a speech-recognition component that employs any number of conventional speech processing techniques such as use of speech recognition, natural-language understanding, and extensive lexicons to interpret voice input. In some instances, the speech-recognition component may simply be programmed to identify the user uttering a predefined word or phrase (e.g., a "wake word"), after which the electronic device 150 may begin uploading data to a network device for more robust speech-recognition processing. In other examples, the electronic device 150 itself may, for example, identify voice commands from user(s) and provide indications of these commands to the network device. The electronic device 150 may also include a plurality of applications or games stored in the computer-readable media 1202 or otherwise accessible to the electronic device 150.

Figure 13:
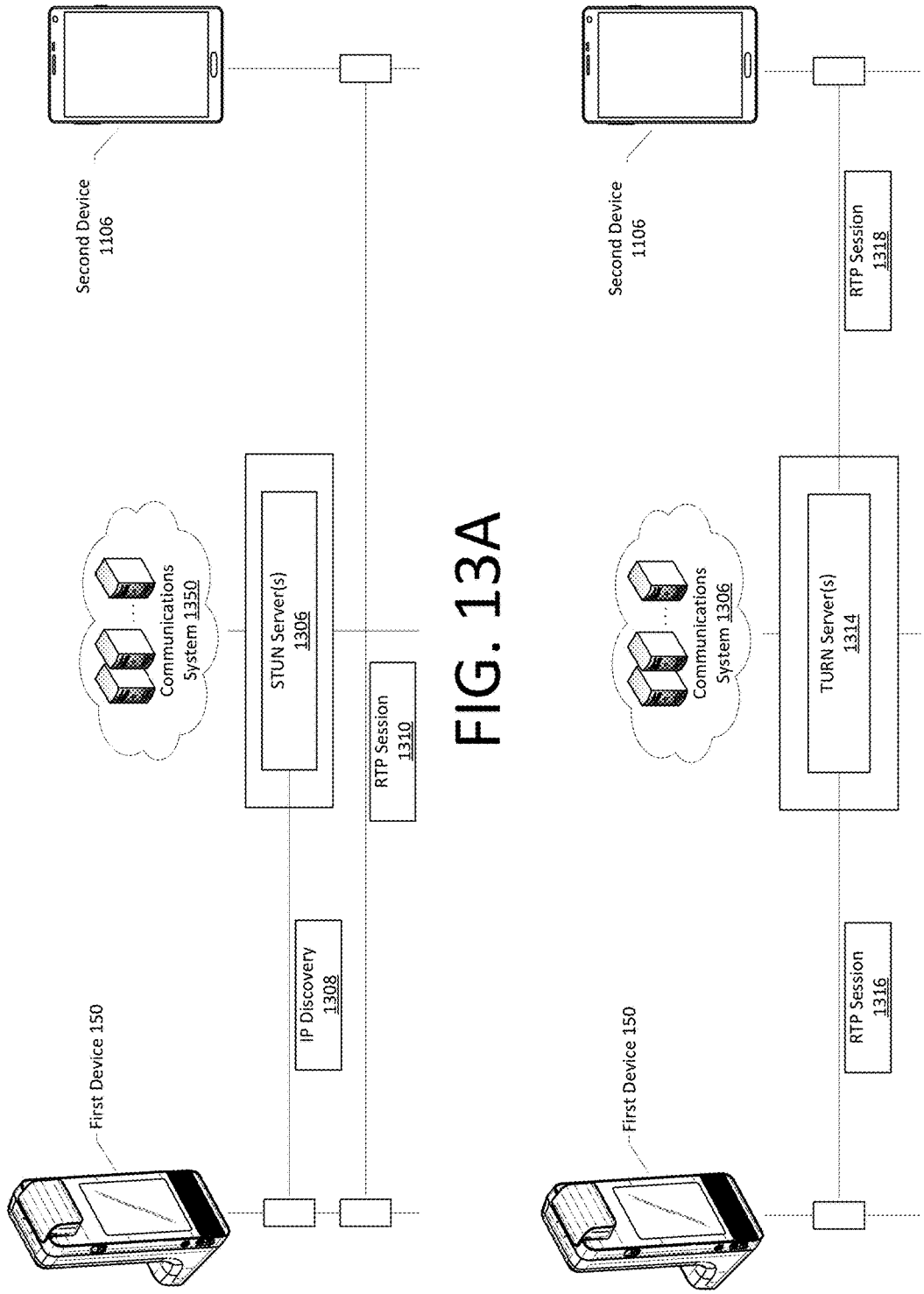
FIGS. 13A and 13B illustrate example components for establishing a flow of data between devices.

FIGS. 13A and 13B illustrate example components for establishing a flow of data between devices. For instances, FIGS. 13A and 13B illustrate examples of establishing media streams between devices according to the present disclosure. In examples, the first device 150 may have a publicly accessible IP address and may be configured to establish the RTP communication session directly with the second device 1106. To enable the first device 150 to establish the RTP communication session, the communications system 1350 may include Session Traversal of User Datagram Protocol (UDP) Through Network Address Translators (NATs) server(s), such as STUN server(s) 1306. The STUN server(s) 1306 may be configured to allow NAT clients, such as a first device 150 behind a firewall, to setup calls to a VoIP provider and/or a messaging provider hosted outside of the local network by providing a public IP address, the type of NAT they are behind, and a port identifier associated by the NAT with a particular local port. As illustrated in FIG. 13A, the first device 150 may perform, at block 1308, IP discovery using the STUN server(s) 1306 and may use this information to set up an RTP communication session 1310, such as a UDP communication, between the first device 150 and the second device 1106 to establish a call.

In some examples, the first device 150 may not have a publicly accessible IP address. For example, in some types of NAT the first device 150 cannot route outside of the local network. To enable the first device 150 to establish an RTP communication session, the communications system 1350 may include Traversal Using relays around NAT (TURN) server(s) 1314. The TURN server(s) 1314 may be configured to connect the first device 150 to the second device 1106 when the first device 150 is behind a NAT. As illustrated in FIG. 13B, the first device 150 may establish, at block 1316, an RTP session with the TURN server(s) 1314 and the TURN server(s) 1314 may establish, at block 1318, an RTP session with the second device 1106. Thus, the first device 150 may communicate with the second device 1106 via the TURN server(s) 1314. For example, the first device 150 may send outgoing audio data to the communications system 1350 and the communications system 1350 may send the outgoing audio data to the second device 1106. Similarly, the second device 1106 may send incoming audio/video data to the communications system 1350 and the communications system 1350 may send the incoming data to the first device 150.

In some examples, the communications system 1350 may establish communication sessions using a combination of the STUN server(s) 1306 and the TURN server(s) 1314. For example, a communication session may be more easily established/configured using the TURN server(s) 1314, but may benefit from latency improvements using the STUN server(s) 1306. Thus, the system may use the STUN server(s) 1306 when the communication session may be routed directly between two devices and may use the TURN server(s) 1314 for all other communication sessions. Additionally, or alternatively, the system may use the STUN server(s) 1306 and/or the TURN server(s) 1314 selectively based on the communication session being established. For example, the system may use the STUN server(s) 1306 when establishing a communication session between two devices (e.g., point-to-point) within a single network (e.g., corporate LAN and/or WLAN), but may use the TURN server(s) 1314 when establishing a communication session between two devices on separate networks and/or three or more devices regardless of network(s). When the communication session goes from only two devices to three or more devices, the system may need to transition from the STUN server(s) 1306 to the TURN server(s) 1314. Thus, if the system anticipates three or more devices being included in the communication session, the communication session may be performed using the TURN server(s) 1314.

Figure 14:
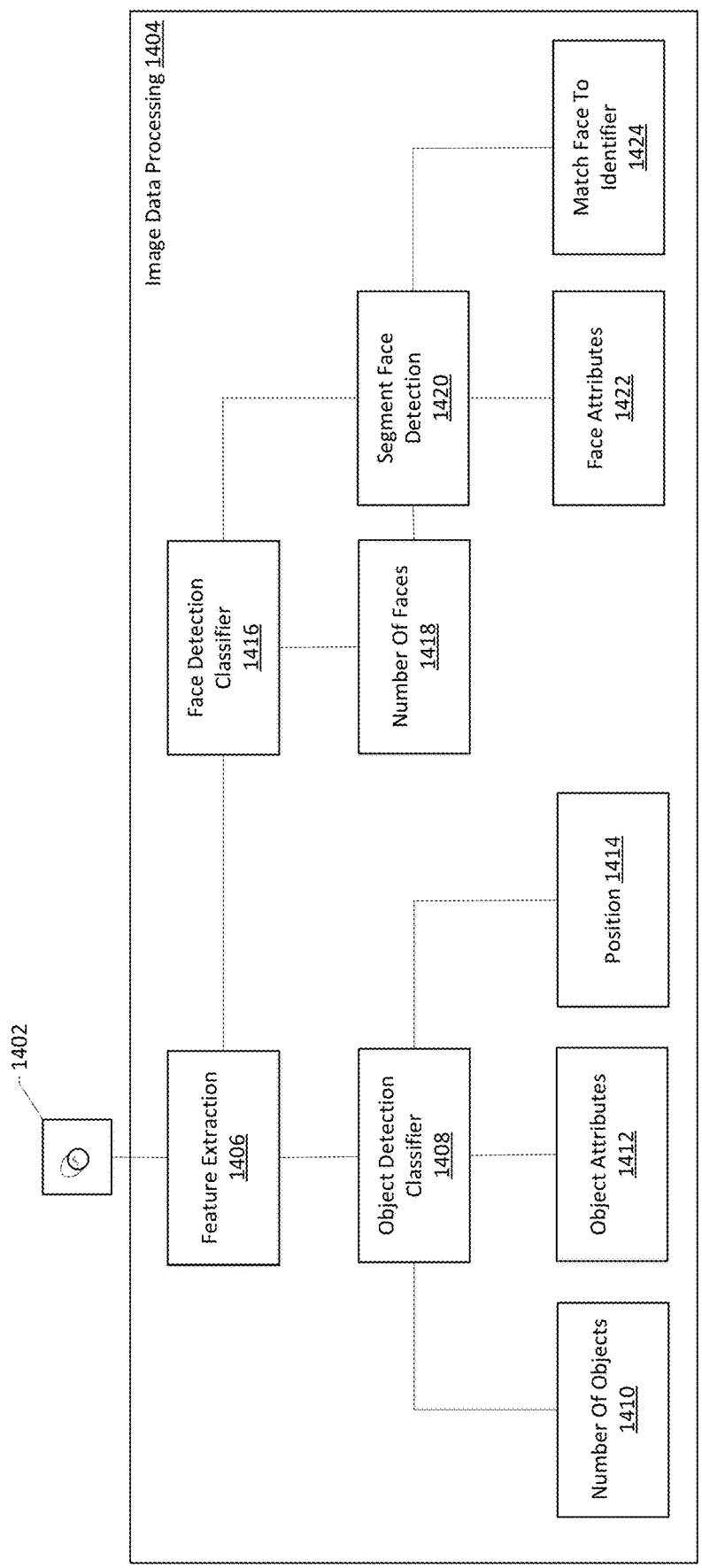
FIG. 14 is a schematic diagram of a process for detecting objects in image data.

FIG. 14 is a schematic diagram of an example process for detecting objects in image data. For example, a camera apparatus 1402 acquires image data for processing using image data processing 1404. In some instances, the image data processing 1404 can be performed by the camera apparatus 1402. In some instances, the image data processing 1404 can be performed by other components. For instance, a system can receive the image data from the camera apparatus 1402, and then perform the image data processing 1404.

To process the image data, the image data processing 1404 can use one or more image processing techniques (e.g., facial recognition, object recognition, etc.) to extract features 1406 from the image data. In some instances, the features can include objects (e.g., guests, robots, etc.) and faces. For instance, the image data processing 1404 can identify each object and face that is within the image data.

For objects, the image data processing 1404 may include an object detection classifier 1408 in order to detect a number of objects 1410 in a field of view, attributes 1412 (e.g., characteristics) associated with each of the objects, and a position 1414 for each of the objects. For instance, the number of objects 1410 can include how many objects are in the field of view. The attributes 1412 associated with each object can include a height of the object, hair color of the object, an approximate weight of the object (e.g., 100 pounds), a body type for the object (e.g., slim, etc.), clothes that the object is wearing, facial recognition of the object, or the like, object shapes, object colors, object thicknesses, etc.

For faces, the image data processing 1404 can apply a face detection classifier 1416 in order to detect a number of faces 1418. Additionally, for each face, the image data processing 1404 can perform segment face detection 1420 in order to determine attributes 1422 (e.g., characteristics) for each of the faces at the environment and detect an identifier 1424 for each of the faces at the environment.

Attributes 1422 for each face can include a relative size, a color, a shape of the face, or the like. An identifier 1424 for a face can include any type of identity, such as a user profile identifier.

When image data is described herein as being analyzed, that analysis may include the use of computer vision to identify objects depicted in the image data. For example, with respect to computer vision techniques, computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)— Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Some functions and components (e.g., hardware) found in many computer vision systems are described here. For example, a digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance. Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales. Image features at various levels of complexity are extracted from the image data. Typical examples of such features are: Lines, edges, and ridges; Localized interest points such as corners, blobs, or points; More complex features may be related to texture, shape, or motion. At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy). At this point, the input may be a small set of data, for example a set of points or an image region that is assumed to contain a specific object. The remaining processing may comprise, for example: verification that the data satisfy model-based and application-specific assumptions; estimation of application-specific parameters, such as object pose or object size; classifying a detected object into different categories; and comparing and combining two different views of the same object. Making the final decision required for the application, for example match/no-match in recognition applications, may then be performed.

Figure 15:
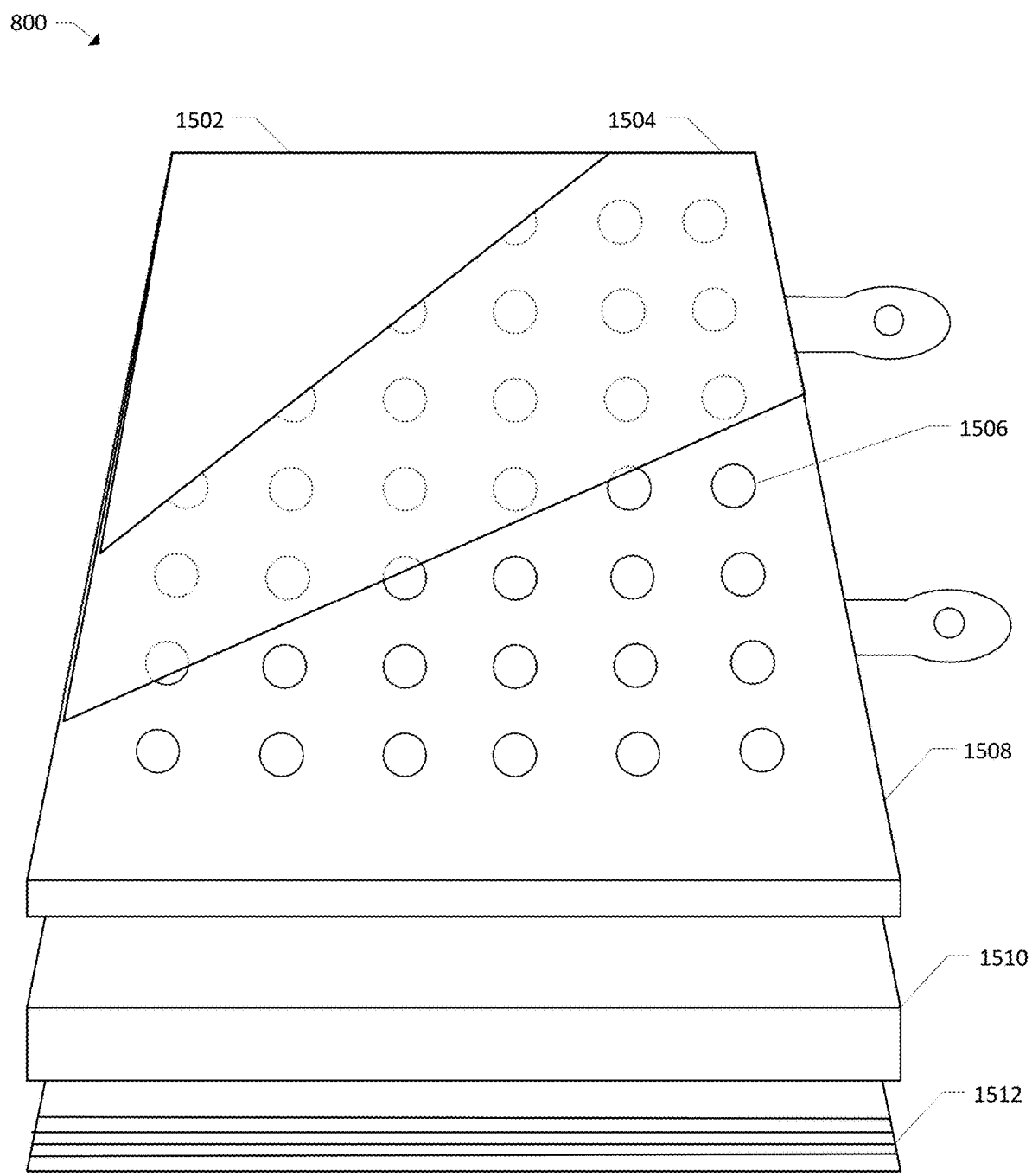
FIG. 15 illustrates examples components of a touchscreen.

FIG. 15 illustrates examples components of a touchscreen. The touchscreen 1500 may include components such as a flexible transparent surface 1502, a first transparent conductive layer 1504, a second transparent conductive layer 1508, one or more non-conductive separators 1506, a substrate 1510, and/or one or more display layers 1512.

In practice, a voltage is applied to each of the first transparent conductive layer 1504 and the second transparent conductive layer 1508. It should be understood that the conductive layers described herein may not be transparent. One of the voltages is utilized to detect touch location in a first direction, such as horizontally, while the other voltage is utilized to detect touch location in a second direction, such as vertically. As such, when a conductive object, such as a user's finger comes into contact with the capacitive field generated by the voltages, differences in voltage are detected in the horizontal and vertical direction, which provides an indication of the location of the user's touch on the touchscreen. In these examples, an object's touch on the screen generates a capacitor with the first transparent conductive layer 1504 and the second transparent conductive layer 1508. This may change the electrostatic field of the touchscreen, which may register as a detected touch. Sensors positioned on the touchscreen, such as at the edges of the touchscreen and/or at the corners, may detect the changes in the electrostatic field and deduce the location of the touch from those electrostatic field changes. The flexible transparent surface 1502 may act as a surface for receiving object touches and may be composed of a material that does not inhibit and/or that minimizes distortion of the capacitive field. The non-conductive separators 1506 may be utilized to create a space between the first transparent conductive layer 1504 and the second transparent conductive 1508, which may be particularly used when the touchscreen also includes resistive touch sensing capabilities. The substrate 1510 may act as a base to which the conductive layers may be attached. The display layers 1512 may be configured to cause display of images, which may be displayed through the other surfaces and layers of the touchscreen.

FIG. 16A illustrates an example touch-sensitive surface with a first capacitive field tuning. FIG. 16A shows a touch-sensitive surface with a transmitter electrode 1602, a receiver electrode 1604, a dielectric material 1606, and representations of electric field lines 1608.

In this example, a voltage is applied from a voltage source. For example, a driver component may be configured to cause a voltage to be output from the voltage source to the transmitter electrode 1602. The voltage may cause an electric field to be generated from the transmitter electrode 1602 to the receiver electrode 1604. The electric field may extend through at least a portion of the dielectric material 1606 and to a surface of the dielectric material 1606 and/or one or more layers and/or surfaces placed on the dielectric material 1606. Prior to a touch being detected, a mutual capacitance may be measured as between the transmitter electrode 1602 and the receiver electrode 1604. When a conductive object, such as a user's finger, comes into contact with the electric field, at least a portion of the electric field may be disturbed such that the receiver electrode 1604 does not receive the same voltage as it did prior to the user's finger coming into contact with the electric field. In this example, the mutual capacitance when the user's finger contacts the electric field will be less than the mutual capacitance prior to the finger coming into contact with the electric field. This mutual capacitance difference may be measured to detect touches.

In this example, the capacitive field is tuned such that the capacitive field extends to approximately the surface of the dielectric material 1606. This tuning may include setting the voltage applied by the voltage source, setting the receiver electrode 1604 to receive a given voltage, such as a gain value, from the transmitter electrode 1602, and/or interpreting the difference in measured mutual capacitance in different ways.

FIG. 16B illustrates an example touch-sensitive surface with a second capacitive field tuning. FIG. 16B shows a touch-sensitive surface with a transmitter electrode 1602, a receiver electrode 1604, a dielectric material 1606, and representations of electric field lines 1608. As shown in FIG. 16B, the voltage source has been tuned to apply more voltage to the transmitter electrode 1602 than the voltage applied in FIG. 16A.

For example, a driver component may be configured to cause a voltage to be output from the voltage source to the transmitter electrode 1602. The voltage may cause an electric field to be generated from the transmitter electrode 1602 to the receiver electrode 1604. Here, the electric field may be greater than the electric field indicated in FIG. 16A, which is represented as wider and taller electric field lines 1608. The electric field may extend through at least a portion of the dielectric material 1606 and above a surface of the dielectric material 1606 and/or one or more layers and/or surfaces placed on the dielectric material 1606. Prior to a touch being detected, a mutual capacitance may be measured as between the transmitter electrode 1602 and the receiver electrode 1604. When a conductive object, such as a user's finger, comes into contact with the electric field, at least a portion of the electric field may be disturbed such that the receiver electrode 1604 does not receive the same voltage as it did prior to the user's finger coming into contact with the electric field. In this example, the mutual capacitance when the user's finger contacts the electric field will be less than the mutual capacitance prior to the finger coming into contact with the electric field. This mutual capacitance difference may be measured to detect touches. Here, the interpretation of the mutual capacitance difference may be tuned such that a lesser degree of mutual capacitance difference will be interpreted as a touch.

In this example, the voltage source, the receiver electrode 1604, and/or how the mutual capacitance difference is interpreted may be tuned to detect touches above the surface of the dielectric material 1606, and optimally on a surface of an object placed on the touch-sensitive surface.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A device, comprising:
one or more processors; and
non-transitory computer-readable media storing computer-executable instructions that, when executed by the one or more processors, cause the one or more processors to perform operations comprising:
receiving, from one or more capacitive touch sensors, first input data indicating that a first object has been placed on a touch-sensitive surface of the device;
determining that the first input data corresponds to first fiducials contacting the touch-sensitive surface of the device based at least in part on the first input data indicating multiple touches on the touch-sensitive surface in a predefined arrangement, the first fiducials composed of a material that changes a mutual capacitance of the touch-sensitive surface when the first fiducials come into contact with the touch-sensitive surface;
identifying, from first characteristics of the first fiducials, an object identifier of the first object;
determining, from the object identifier, first impedance characteristics of the first object, the first impedance characteristics indicating signal impedance caused by a second physical property of the first object unrelated to a physical property of the first fiducials, the signal impedance with respect to the touch-sensitive surface to an opposing side of the first object and a material type associated with the first object;
determining a location of the first object on the touch-sensitive surface utilizing the multiple touches on the touch-sensitive surface in the predefined arrangement;
determining, based at least in part on the first impedance characteristics, a signal pulse frequency to apply at the location; and
causing, utilizing the first impedance characteristics, the one or more capacitive touch sensors to be tuned such that a capacitive field associated with the touch-sensitive surface extends from the touch-sensitive surface to the opposing side of the first object such that the one or more capacitive touch sensors are configured to detect touch input on the opposing side of the first object, wherein causing the one or more capacitive touch sensors to be tuned includes at least applying the signal pulse frequency and increasing a gain setting associated with a portion of the touch-sensitive surface that corresponds to the location of the first object.

2. The device of claim 1, the operations further comprising:
receiving second input data at the location of the first object, the second input data corresponding to a user pressing on the first object;
determining that the second input data is received while the first fiducials are in contact with the touch-sensitive surface; and
selecting a first action to be performed responsive to the second input data, the first action selected in response to the second input data being received at the location and while the first fiducials are in contact with the touch-sensitive surface, the first action differing from a second action associated with received touch input at the location absent the object being placed on the touch-sensitive surface.

3. The device of claim 1, the operations further comprising:
determining, from the first impedance characteristics, a signal voltage to apply to the one or more capacitive touch sensors at the location; and
wherein causing the one or more capacitive touch sensors to be tuned includes applying the signal voltage to the location of the one or more capacitive touch sensors.

4. The device of claim 1, the operations further comprising:
receiving second input data at the location of the first object;
determining that the second input data corresponds to second fiducials of a second object contacting the first object;
determining second impedance characteristics associated with the second object; and
causing the one or more capacitive touch sensors to be tuned, utilizing the second impedance characteristics, such that the capacitive field associated with the touch-sensitive surface extends from the opposing side of the first object through at least a portion of the second object.

5. A method, comprising:
receiving first input data indicating that a first object has been placed on a surface of a device;
determining first characteristics of the first object, the first characteristics indicating signal impedance caused by the first object from the surface to an opposing side of the first object;
determining a location of the first object on the surface;
determining, based at least in part on the first characteristics, a signal pulse frequency to apply at the location; and
causing, utilizing the first characteristics, second characteristics of one or more capacitive touch sensors associated with the location to be tuned such that when a touch input is received on the opposing side of the first object the touch input is detected by the one or more capacitive touch sensors, the second characteristics including the signal pulse frequency and a gain setting associated with a portion of the surface that corresponds to the location of the first object.

6. The method of claim 5, further comprising:
receiving second input data at the location of the first object;
determining that the second input data is received while the first object is in contact with the surface; and
selecting a first action to be performed based at least in part on the second input data being received at the location and while the first object is in contact with the surface.

7. The method of claim 5, further comprising:
receiving second input data at the location of the first object;
determining that the second input data corresponds to fiducials of a second object contacting the first object based at least in part on the second input data indicating multiple touches on the first object in a predefined arrangement;
determining third characteristics associated with the second object; and
causing a sensitivity of the one or more capacitive touch sensors to be tuned such that a capacitive field extends from the opposing side of the first object through at least a portion of the second object.

8. The method of claim 5, further comprising:
determining an object identifier of the first object;
determining an object type of the first object utilizing the object identifier;
determining impedance characteristics associated with the object type; and
wherein determining the first characteristics of the first object comprises determining the first characteristics of the first object based at least in part on the impedance characteristics of the object type.

9. The method of claim 5, further comprising:
determining, based at least in part on the first characteristics, a signal voltage to apply to the one or more capacitive touch sensors at the location; and
causing the one or more capacitive touch sensors to be tuned based at least in part on the signal voltage.

10. The method of claim 5, further comprising:
causing, based at least in part on detecting the first object, output of a request for a user to press the first object;
causing, prior to receiving second input data representing the user pressing the first object, modulation of a capacitive field;
determining, from the modulation of the capacitive field, a gain value that indicates the second input data is being received on the first object; and
selecting the gain setting to apply to the one or more capacitive touch sensors at the location based at least in part on the gain value.

11. The method of claim 5, further comprising:
determining a device identifier of the first object based at least in part on fiducial markers of the first object; and
wherein determining the first characteristics comprises determining the first characteristics based at least in part on the device identifier.

12. The method of claim 5, further comprising:
determining a size of the first object based at least in part on fiducial markers of the first object; and
wherein determining the first characteristics comprises determining the first characteristics based at least in part on the size of the first object.

13. The method of claim 5, wherein causing the second characteristics to be tuned causes a touch-sensitive field to extend further from the surface than prior to tuning the second characteristics.

14. The method of claim 5, further comprising determining the gain setting based at least in part on the first characteristics.

15. A device, comprising:
one or more processors; and
non-transitory computer-readable media storing computer-executable instructions that, when executed by the one or more processors, cause the one or more processors to perform operations comprising:
receiving first input data indicating that a first object has been placed on a surface of the device;
determining first characteristics of the first object, the first characteristics indicating signal impedance caused by the first object from the surface to an opposing side of the first object;
determining a location of the first object on the surface;
determining, based at least in part on the first characteristics, a signal pulse frequency to apply at the location; and
causing, based at least in part on the first characteristics, second characteristics of one or more capacitive touch sensors associated with the location to be tuned such that when a touch input is received on the opposing side of the first object the touch input is detected by the one or more capacitive touch sensors, the second characteristics including the signal pulse frequency and a gain setting associated with a portion of the surface corresponding to the location of the first object.

16. The device of claim 15, the operations further comprising:
receiving second input data at the location of the first object;
determining that the second input data is received while the first object is in contact with the surface; and
selecting a first action to be performed based at least in part on the second input data being received at the location and while the first object is in contact with the surface.

17. The device of claim 15, the operations further comprising:
receiving second input data at the location of the first object;
determining that the second input data corresponds to fiducials of a second object contacting the first object based at least in part on the second input data indicating multiple touches on the first object in a predefined arrangement;
determining third characteristics associated with the second object; and
causing the one or more capacitive touch sensors to be tuned such that a capacitive field extends from the opposing side of the first object through at least a portion of the second object.

18. The device of claim 15, the operations further comprising:
determining an object identifier of the first object;
determining an object type of the first object utilizing the object identifier;
determining impedance characteristics associated with the object type; and
wherein determining the first characteristics of the first object comprises determining the first characteristics of the first object based at least in part on the impedance characteristics of the object type.

19. The device of claim 15, the operations further comprising:
   determining, based at least in part on the first characteristics, a signal voltage to apply to the one or more capacitive touch sensors at the location; and
   causing the one or more capacitive touch sensors to be tuned based at least in part on the signal voltage.

20. The device of claim 15, the operations further comprising:
   causing, based at least in part on the first input data, output of a request for a user to press the first object;
   causing, prior to receiving second input data representing the user pressing the opposing side of the first object, modulation of a capacitive field;
   determining, from modulation of the capacitive field, a gain value that indicates the second input data is being received on the first object; and
   selecting the gain setting to apply to the one or more capacitive touch sensors at the location based at least in part on the gain value.

\* \* \* \* \*